United States Patent [19]

Saegusa et al.

[11] 4,448,506
[45] May 15, 1984

[54] EXPOSURE CONTROL DEVICE OF A CAMERA

[75] Inventors: Takashi Saegusa, Sagamihara; Osamu Maida, Tokyo; Toru Fukuhara, Isehara, all of Japan

[73] Assignee: Nippon Kogaku K.K., Tokyo, Japan

[21] Appl. No.: 396,060

[22] Filed: Jul. 7, 1982

Related U.S. Application Data

[63] Continuation of Ser. No. 141,886, Apr. 21, 1980, abandoned.

[30] Foreign Application Priority Data

Apr. 27, 1979 [JP] Japan .................................. 54-51527
May 1, 1979 [JP] Japan .................................. 54-52470
Jun. 15, 1979 [JP] Japan .................................. 54-75419

[51] Int. Cl.³ .................... G03B 7/087; G03B 7/097; G03B 17/18
[52] U.S. Cl. .................................. 354/431; 354/443; 354/448; 354/474
[58] Field of Search ................ 354/31, 42-44, 354/29, 30, 36, 38, 53, 56, 60 E, 60 L; 356/221, 222, 226; 250/214 P

[56] References Cited

U.S. PATENT DOCUMENTS 3,973,266 8/1976 Kakunodate et al. ................ 354/31
4,047,187 9/1977 Mashimo et al. ................ 354/31 X
4,176,955 12/1979 Yamada et al. ...................... 354/31

Primary Examiner—William B. Perkey
Attorney, Agent, or Firm—Fitzpatrick, Cella, Harper & Scinto

[57] ABSTRACT

An exposure control device of a camera comprises first metering means for effecting metering while dividing an object into a plurality of metering areas and for generating a first metering output determining the exposure of the entire object on the basis of a plurality of photoelectric outputs corresponding to said areas, second metering means for generating a second metering output corresponding to the object light passed through the aperture of a phototaking lens, first operational means for generating a first operation output including information on the difference between the first metering output and the second metering output, second operational means for synthesizing the second metering output during the stop-down of said aperture and the first operation output and generating a second operation output, and blocking means for blocking the stop-down when the second operation output and an output corresponding to a preset shutter speed assume a predetermined relation.

21 Claims, 40 Drawing Figures

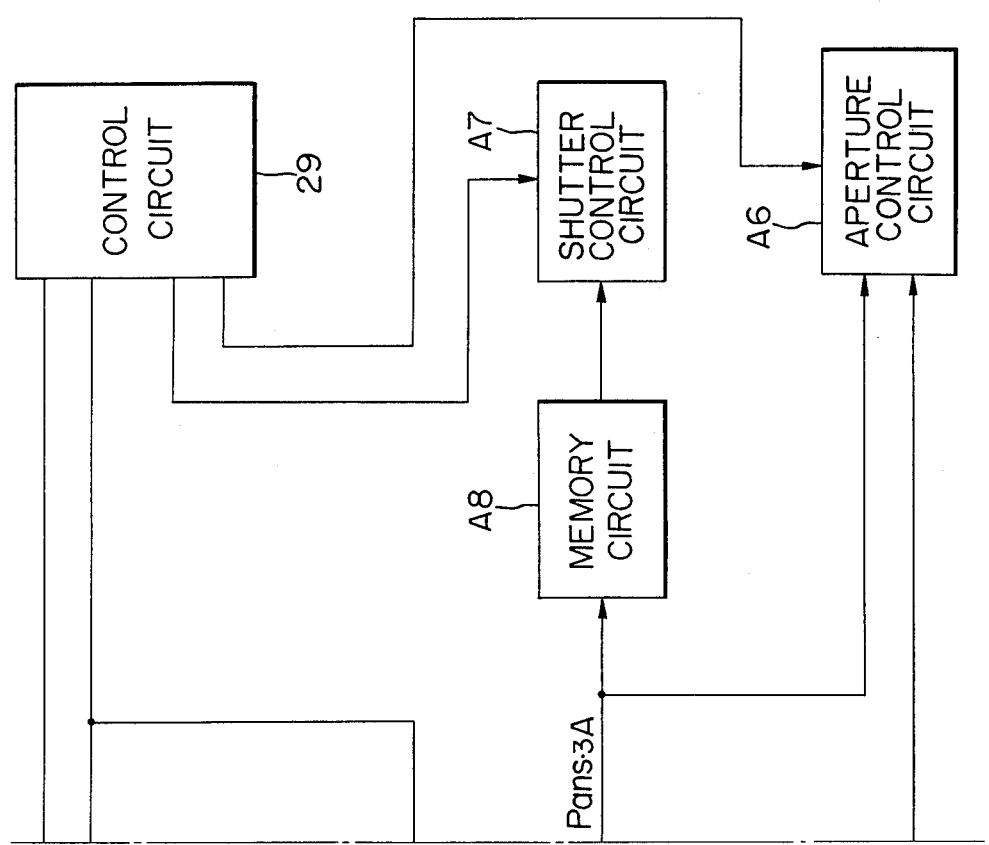

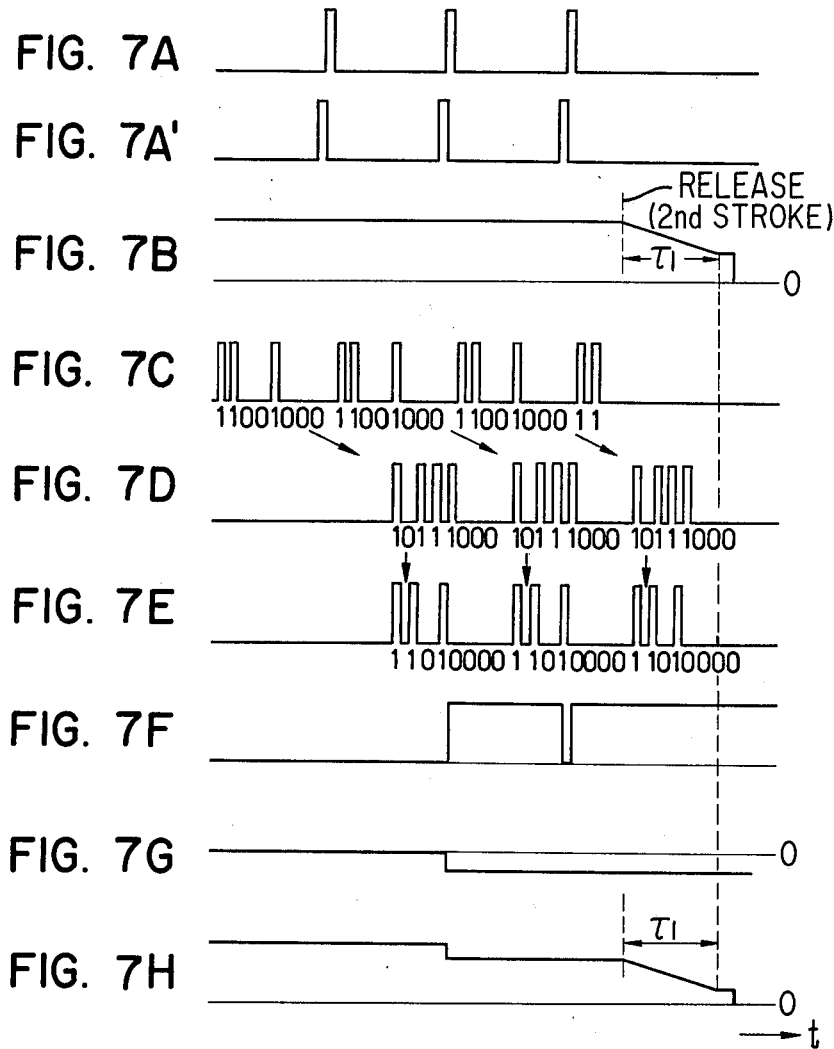

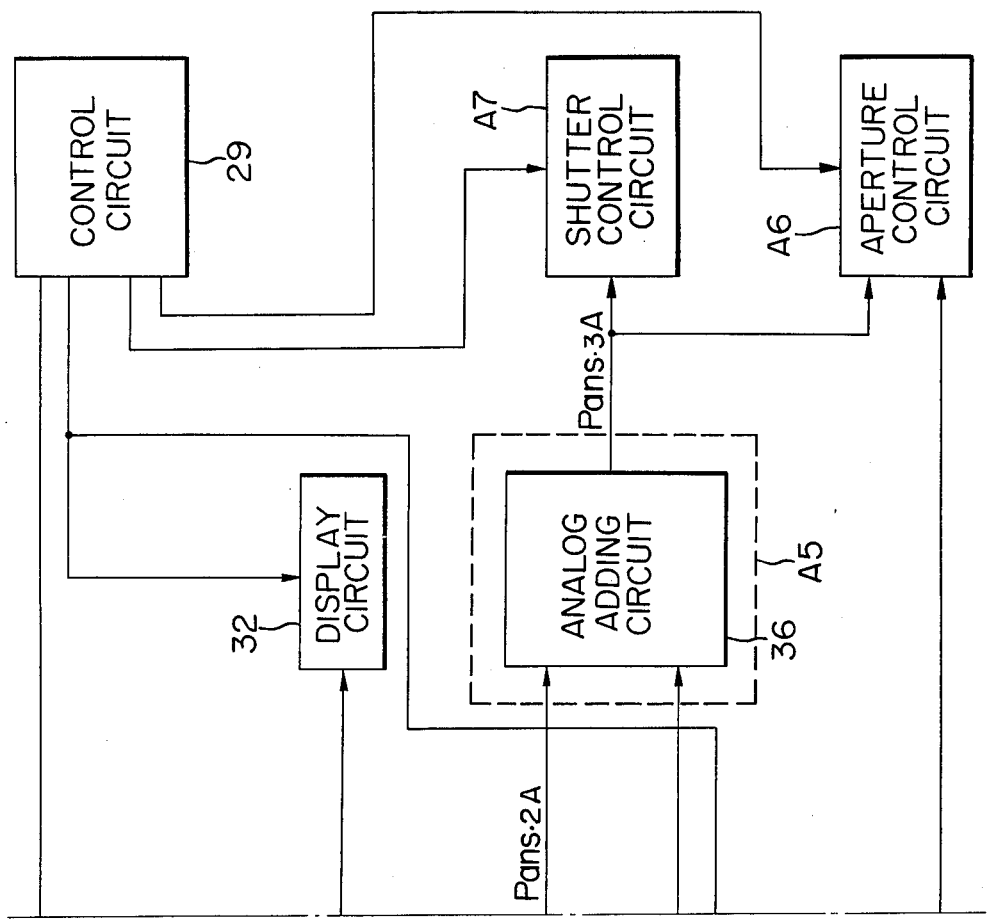

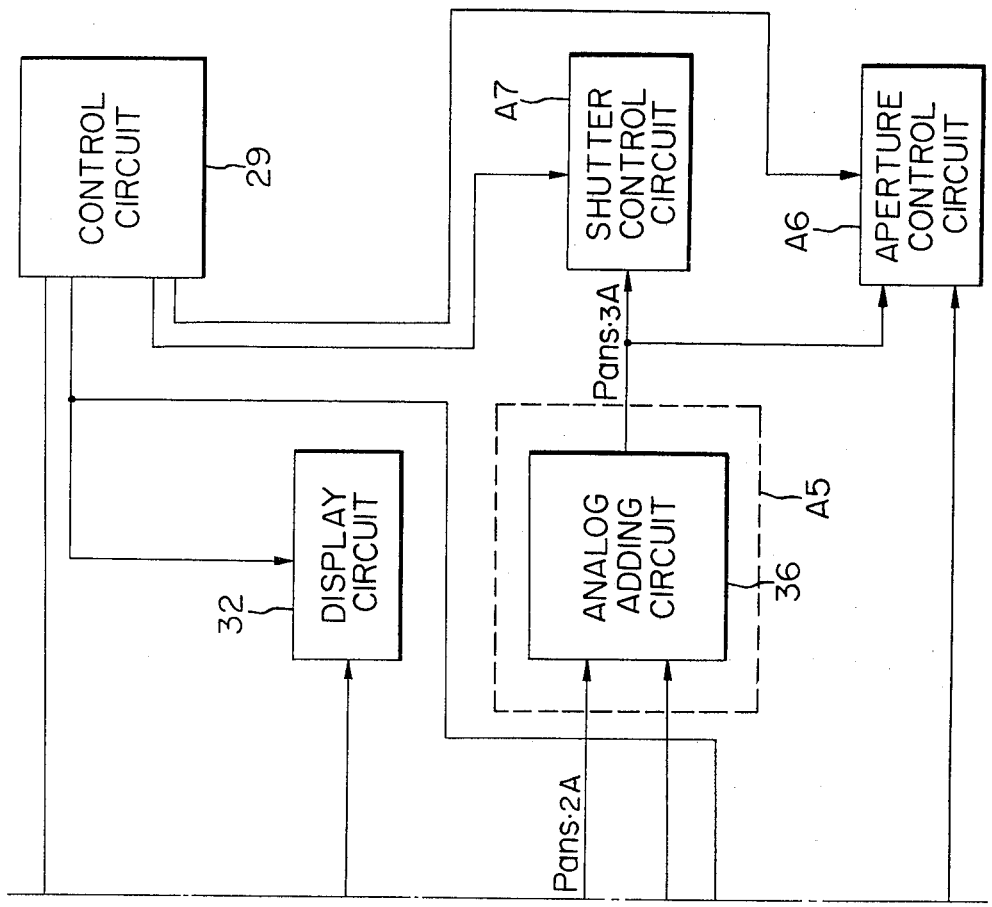

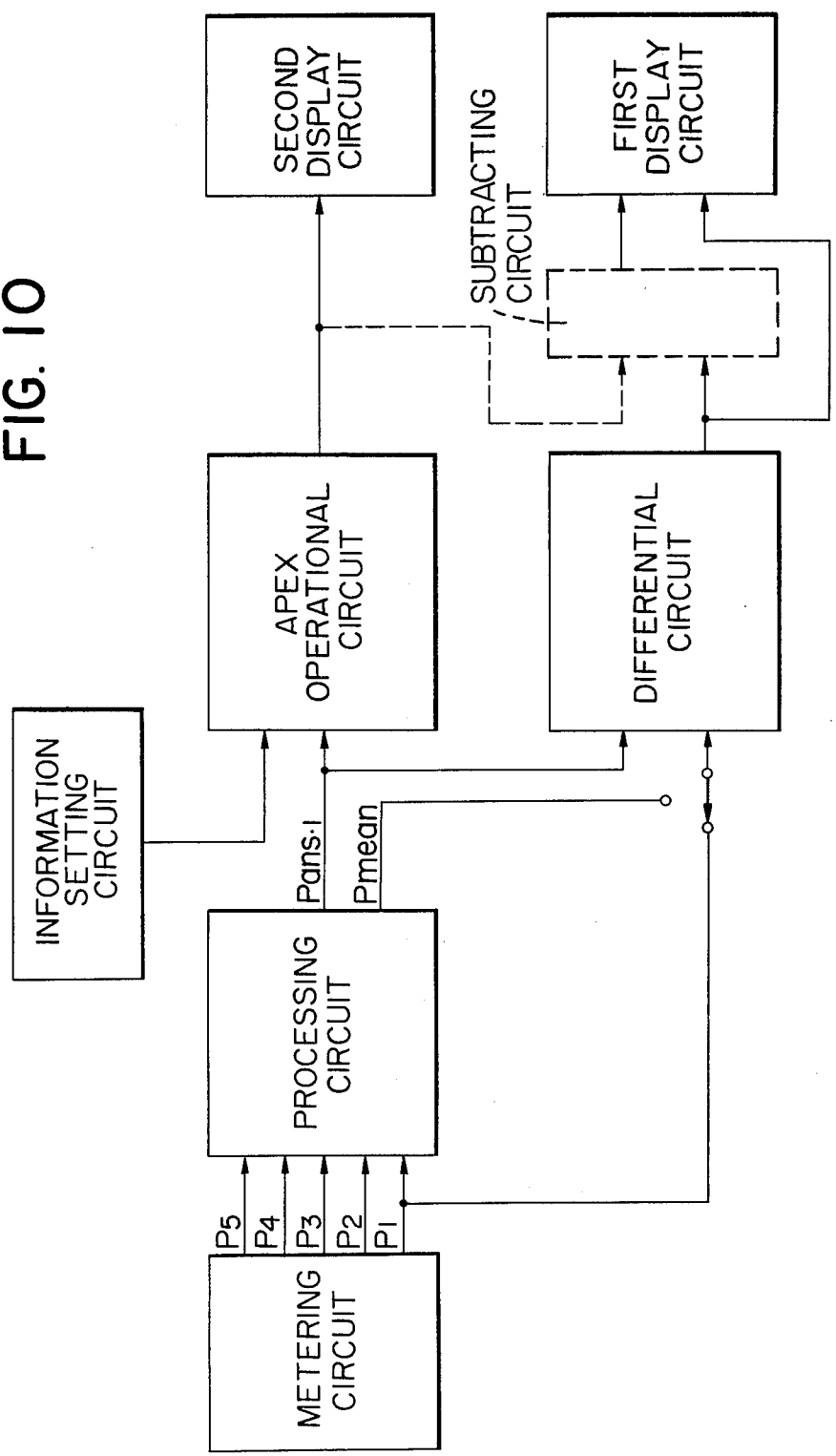

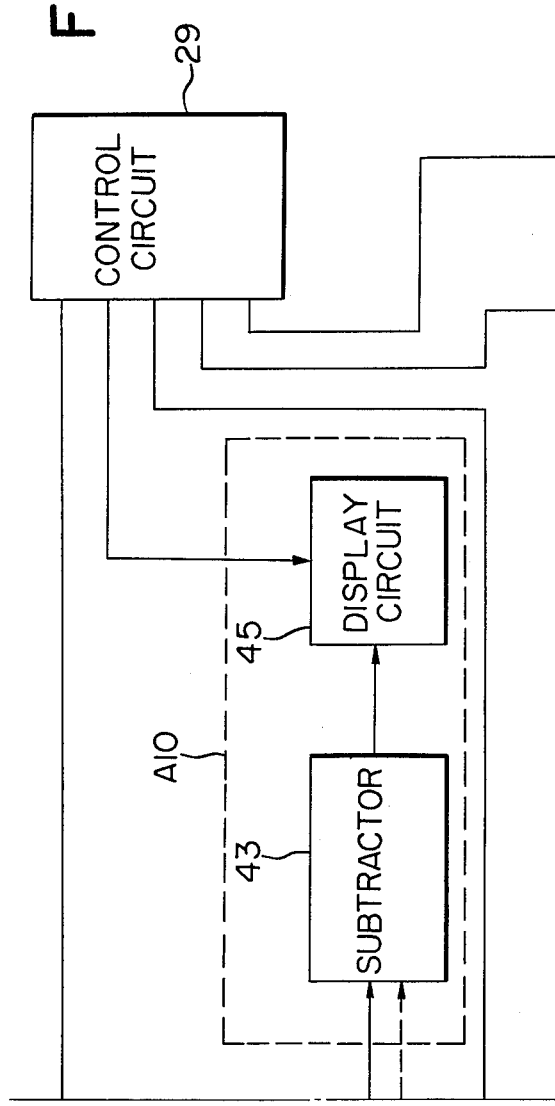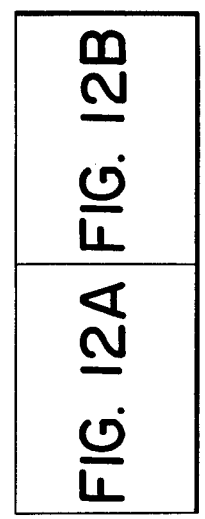

FIG. 16A      FIG. 16B      FIG. 16C
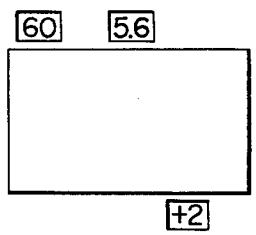
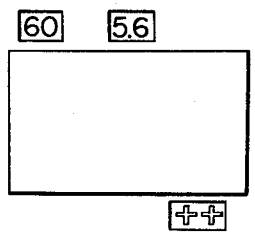
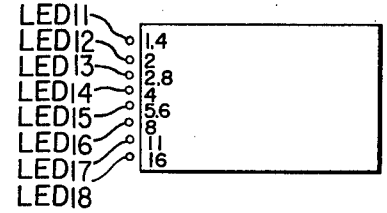
FIG. 17
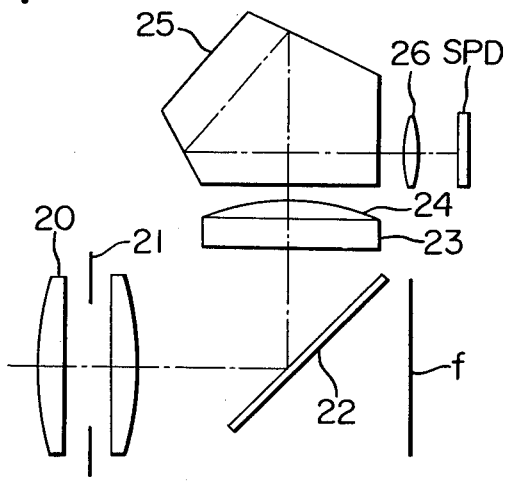
FIG. 18
| SPD1 | SPD2 | SPD3 | SPD4 | SPD5 |
|------|------|------|------|------|
| SPD6 | SPD7 | SPD8 | SPD9 | SPD10 |
| SPD11 | SPD12 | SPD13 | SPD14 | SPD15 |
← SPD

EXPOSURE CONTROL DEVICE OF A CAMERA

This is a continuation of application Ser. No. 141,886, filed Apr. 21, 1980, now abandoned.

BACKGROUND OF THE INVENTION

1. Field of the Invention

This invention relates to an automatic exposure control device of a camera, and more particularly to an automatic exposure control device of a camera having a metering device for dividing a phototaking picture plane into a plurality of areas, processing the metering output for each area and determining the exposure of the entire picture plane.

2. Description of the Prior Art

A metering device for dividing the phototaking picture plane into a plurality of areas, processing the metering output for each of the areas and operating a metering output for determining the exposure of the entire picture plane (hereinafter referred to as the multimetering device) is already known from Japanese Laid-open Patent Applications Nos. 12828/1977 and 52419/1978. As techniques similar to these, the assignee of this invention filed Japanese Patent Applications Nos. 23019/1979, 23020/1979 and 23021/1979. This multimetering device has an advantage that in photographing an ordinary object having a relatively small brightness difference between parts thereof as well as a special object having a great brightness difference between parts thereof, such as, for example, a figure under counter-light or a figure under spot light illumination, such object is automatically discriminated and an exposure suitable therefor is obtained.

The techniques disclosed in the aforementioned Japanese Laid-open Patent Applications Nos. 12828/1972 and 52419/1978 are as follows. The maximum value $P_{max}$ and minimum value $P_{min}$ of a plurality of bits of brightness information (metering outputs) obtained from the metering areas of the phototaking picture plane are detected, whereby the difference $P_{max} - P_{min}$ and the mean value $P_{mean} = P_{max} + P_{min}/2$ are operated. This difference $P_{max} - P_{min}$ is compared with a reference value $\delta$ by a comparing circuit and judgment is made that when $P_{max} - P_{min} \leq \delta$, the object is one having not so great a brightness difference between parts thereof and that when $P_{max} - P_{min} > \delta$, the object is one having a great brightness difference between parts thereof. When $P_{max} - P_{min} \leq \delta$, the mean value $P_{mean}$ of the plurality of metering outputs is put out, and when $P_{max} - P_{min} > \delta$, discrimination is made as to whether the object is a white back (an object having a great deal of light portion in the background like a figure under counter-light) or a black back (an object having a great deal of dark portion in the background like a figure under spot light illumination) and then $P_{max}$ or $P_{min}$ is put out. The $P_{mean}$, $P_{max}$ or $P_{min}$ provides the final proper exposure value which determines the exposure of the entire picture plane.

The discrimination between a white back and a black back is accomplished by comparing the mean value $P_{mean}$ with the median value $(P_{max} + P_{min})/2$. That is, when the median value is greater than the mean value, the object is often one the whole of which is dark and therefore such object is decided as a black back and in the converse case, the object is decided as a white back. In the case of a black back, namely, $(P_{max} + P_{min})/2 \geq P_{mean}$, the maximum value $P_{max}$ is put out and in the case of a white back, namely, $(P_{max} + P_{min})/2 < P_{mean}$, the minimum value $P_{min}$ is put out.

On the other hand, an aperture control device of the type in which while the aperture of the lens is being stopped down from the open aperture diameter toward the minimum aperture diameter, the light from an object passed through the aperture opening is measured by a photoelectric element and when the brightness of the object and the aperture diameter being stopped down assume a relation corresponding to a preset shutter speed, the stop-down operation is blocked to automatically adjust the aperture, whereby automatically controlling the exposure is already known from Japanese Patent Publication No. 23779/1974 (corresponding U.S. Pat. No. 3,829,867 and German Pat. No. 2,133,212).

Thus, it occurs to mind to achieve further improved automatic exposure control by combining the multimetering device and this automatic exposure control device. In this case, however, attention must be paid to the following. That is, in some cases, the operated metering output of the multimetering device (multimetering output) is not coincident with any of the metering outputs in the metering areas before the operation, depending on the conditions of the object. In contrast, where said combination is achieved as by replacing the photoelectric element of the automatic exposure control device with part or whole of the photoelectric element of the multimetering device (the replaced photoelectric element of the multimetering device will hereinafter be referred to as the monitoring photoelectric element), the stop-down blocking period must be determined by effecting the stop-down metering with the aid of the monitoring photoelectric element and therefore, if the multimetering output and the metering output of the monitoring photoelectric element are not coincident with each other before the stop-down, a control error corresponding to that output difference occurs to the controlled aperture opening. For example, where the monitoring photoelectric element is designed to meter the central area of the picture plane, when the multimetering device generates a multimetering output to adjust the exposure with a major object lying at a corner of the picture plane, the automatic exposure control device blocks the stop-down when the relation between the aperture obtained from the output of the monitoring photoelectric element and the brightness of the object in the center of the picture plane has come to correspond to a preset shutter speed and therefore, the aperture control with respect to the major object lying at a corner of the picture plane is not effected.

What has been described above also applies to a case where the multimetering photoelectric element does not act also as the monitoring photoelectric element, for example, a case where the monitoring photoelectric element meters the reflected light from a film surface or a shutter curtain surface and the multimetering photoelectric element meters the light passed through the focus plate of the camera.

Moreover, in Japanese Laid-Open Patent Application No. 12828/1977, it is further disclosed that the main switch SW is interlocked with the shutter releasing operation and when this main switch is closed, a channel change-over circuit CS is brought into operation so as to close progressively and according to the time division analog switches AG1, AG2, . . . AGn at the front stage. Therefore, the logarithmic voltages P1, P2, . . . Pn which are fed from the terminals of the analog switches are introduced into a circuit PH for detecting and holding the maximum output value and a circuit VH for detecting and holding the minimum output value, so that the maximum voltage P max and the minimum voltage P min may be detected and held by these circuits PH and VH.

When all of the analog switches AG1, AG2, ... AGn are closed through the channel change-over circuit CS, the outputs P1, P2, ... Pn fed from the other terminals of the analog switches are introduced into a circuit MH for operating and holding the average value so that the average value P mean of the outputs P1, P2, ... Pn may be operated and held by the circuit MH.

When the above-mentioned process is finished, the subtraction between the minimum and the maximum values (P max−P min) is accomplished by an operational amplifier OP1, while the median between the maximum and the minimum values (P max+P min/2) is obtained by another operational amplifier OP2. Then, the difference voltage resulted from the subtraction between the minimum and the maximum values (P max−P min) is compared with a predetermined voltage δ by a comparator CP1 arranged at the subsequent stage, and it can be judged that P max−P min≧δ, the object has not so large a difference in its luminance on each surface section thereof and that when P max−P min>δ, the object has a large difference in its luminance on each surface section thereof.

For example, in the case of P max−P min≦δ, the comparator CP1 is kept in its OFF stage and an analog switch AS3 at the back stage is closed by an inverter G3 so that the average value operation and detecting circuit MH feeds an average value (P1+P2+ ... +Pn)/n as an output. In the case of P max−P min>δ, it is determined whether the background is white (the background has many bright portions) or black (the background has many dark portions), combining with the result obtained from the manner which will be described later, so that P max of P min or a value approximating P max or P min is fed, as an output, from the circuit MH.

In the latter case, it is determined whether the background is white or black in such a manner that the median (P max+P min)/2 and the average value P mean are compared with each other by another comparator CP2. Namely, when the median is larger than the average value, it is determined that the background is black since the object has often dark portions overall, while when the average value is larger than the median it is determined that the background is white since the object has often bright portions overall.

In case both of the median and the average value are compared with each other to give a result P max+P min/2≦P mean, the other comparator CP2 is put ON. If the comparator CP1 is also in the state of P max−P min>δ and is kept ON at this time, an AND gate G1 will be put ON and the analog switch AS1 is closed to thereby feed P max as an output. On the contrary, in case the average value is larger than the median, the other comparator CP2 is put OFF. Since the OFF signal is inverted by an inverter G4 at this time, an AND gate G2 is put ON and an analog switch AS2 is closed to thereby feed P min as an output.

It is also noted that while this publication teaches judging the pattern of an object by comparing the analog quantities in the embodiment shown in the Figures thereof, it also discloses that comparison of digital quantities may be carried out instead.

SUMMARY OF THE INVENTION

It is a primary object of the present invention to provide an automatic exposure control device of a camera in which the multimetering output from a multimetering device and the metering output from a monitoring photoelectric element are combined with each other and said two outputs are utilized to thereby enable further improved exposure control.

It is a further object of the present invention to provide an exposure display device of a camera which, in order to make the most of the advantage of the multimetering device and further add to the function, displays the difference between the metering output of the multimetering device and the output of the monitoring photoelectric element, thereby enabling the intention of the photographer to be reflected in the exposure.

It is still a further object of the present invention to provide an exposure control device of a camera in which the multimetering and the ordinary part metering can be changed over easily by a simple construction.

The invention will become fully apparent from the following detailed description thereof taken in conjunction with the accompanying drawings.

BRIEF DESCRIPTION OF THE DRAWINGS

FIGS. 7a-7h are timing charts.

FIGS. 8, 8A and 8B show a second circuit example of the first embodiment.

FIGS. 9, 9A and 9B show a third circuit example of the first embodiment.

FIG. 10 is a block diagram showing the basic construction of a second embodiment of the present invention.

FIGS. 12, 12A and 12B show a first circuit example of the second embodiment.

FIGS. 16a-16c illustrate the method of visually displaying the correction stage number and aperture value.

FIG. 17 is a schematic view showing a metering optical system.

FIG. 18 shows the light-receiving surface pattern of the photoelectric element SPD of FIG. 17.

FIG. 19b shows the metering circuit of FIG. 19a.

DESCRIPTION OF THE PREFERRED EMBODIMENTS

The present invention will hereinafter be described with respect to embodiments thereof.

Figure 1:
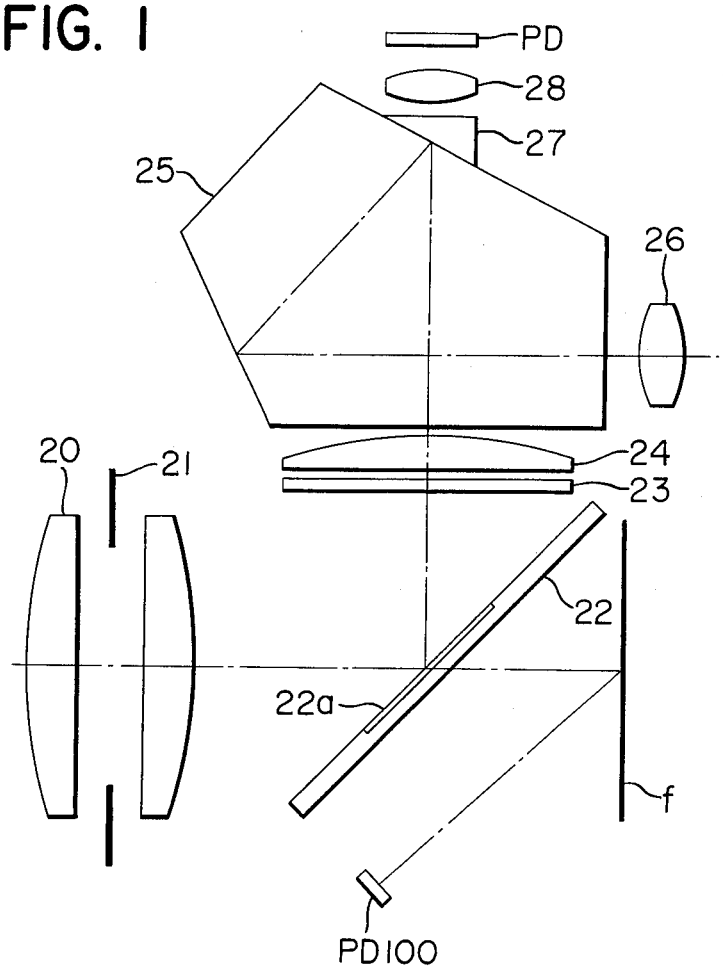
FIG. 1 is a schematic view showing a metering optical system.
Figure 2:
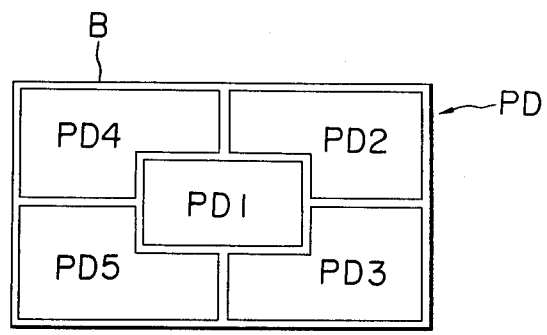
FIG. 2 shows the light-receiving surface pattern of the photoelectric element PD of FIG. 1.

Referring to FIG. 1 which is a schematic view showing a metering optical system, an object light passed through a phototaking lens 20 and a diaphragm 21 is reflected by a mirror 22 and imaged on a focus plate 23. This object image may be viewed through a condenser lens 24, a pentagonal prism 25 and an eyepiece 26. Also, the object image on the focus plate 23 is formed on the light-receiving surface of a photoelectric element PD by a prism 27 attached to the roof surface of the pentagonal prism 25 and a relay lens 28. This photoelectric element PD has a light-receiving surface pattern as shown in FIG. 2. That is, on the substrate B, there is formed a photoelectric element $PD_1$ for metering the central area of the picture plane, photoelectric elements $PD_2$ and $PD_3$ for metering the right upper and lower areas of the picture plane, and photoelectric elements $PD_4 \cdot PD_5$ for metering the left upper and lower areas of the picture plane. The photoelectric elements $PD_1$–$PD_5$ are operable for multimetering, and the photoelectric element $PD_1$ is also operable as the previously described monitoring photoelectric element, and a photoelectric element $PD_{100}$ for receiving the light passed through the half-mirror 22a of the mirror 22 and reflected by a film surface and/or a shutter curtain surface f may be used for monitoring.

Figure 3:
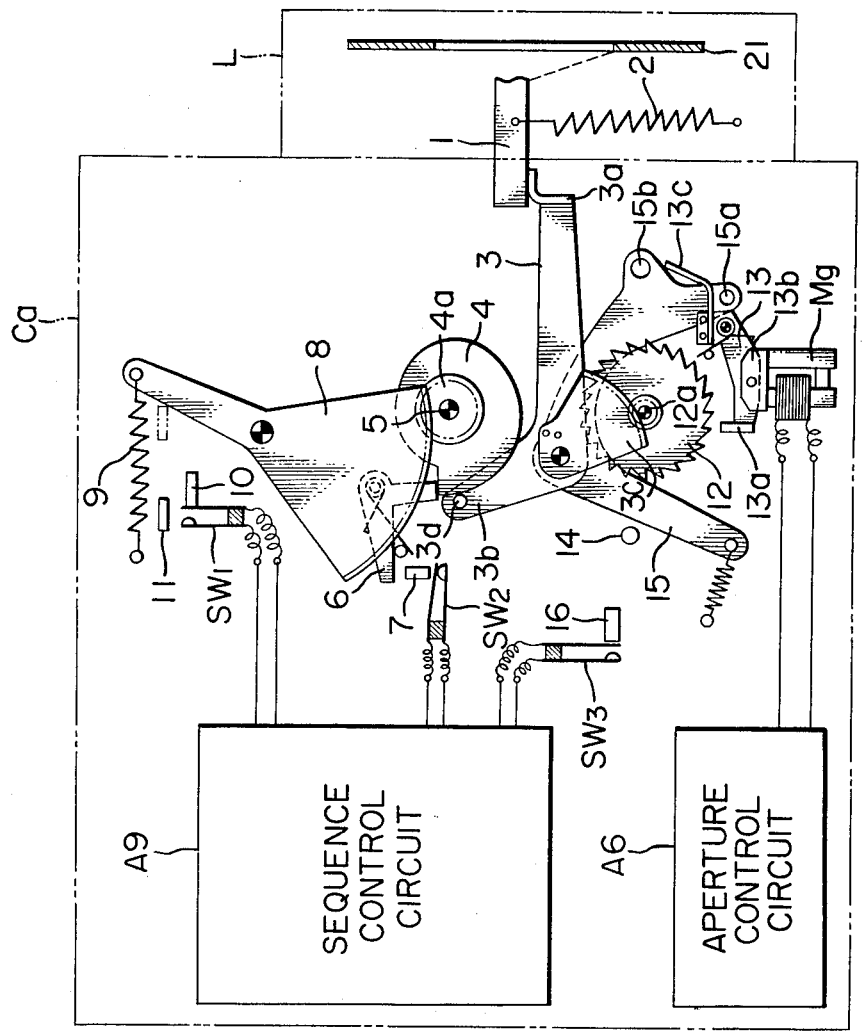
FIGS. 3 and 4 show the mechanical construction of an aperture control device.
Figure 4:
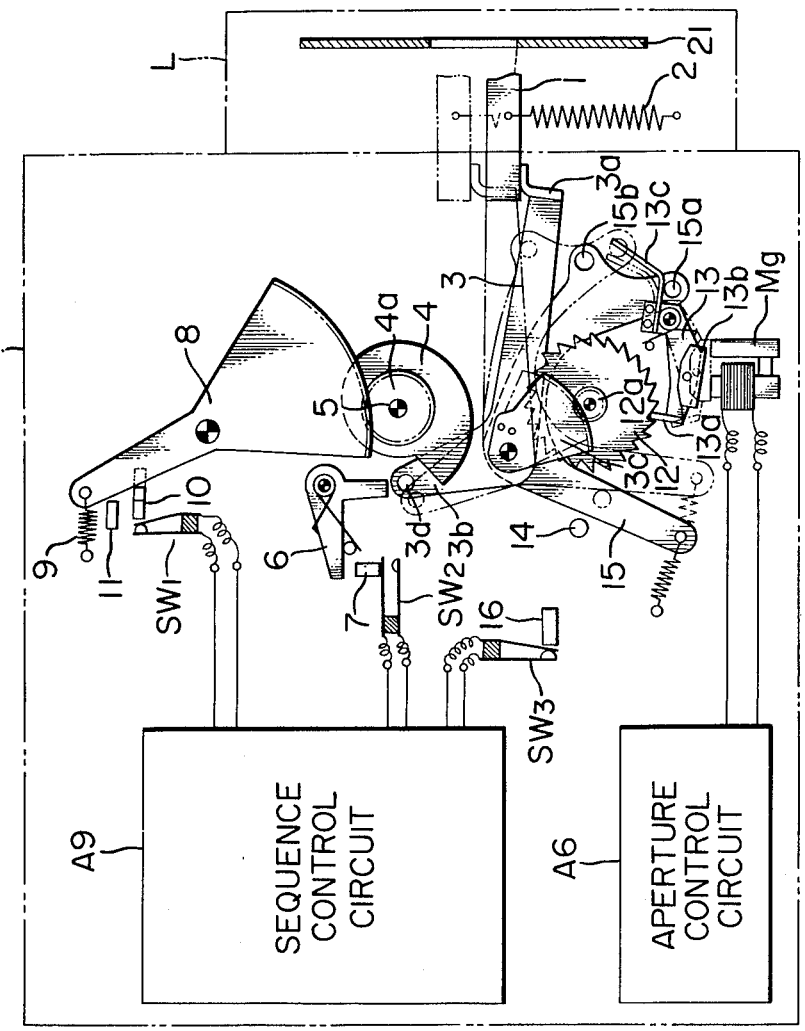

FIGS. 3 and 4 illustrate the mechanical construction of the aperture control device in an automatic exposure control device. Operation will hereinafter be described to know the operation sequence of the aperture control. The lens barrel is set to a condition in which the aperture can be stopped down to a minimum aperture during photography. When a shutter button (not shown) is depressed from the state of FIG. 3, a release member 7 is upwardly moved as viewed in the drawing to push up one end of a release interlocking lever 6. At this time, a switch $sw_1$ is opened at the initial stage of movement of the release member 7 to detect that the operation timing of the aperture control device is between the release operation time and the stop-down operation time. Consequently, the release interlocking lever 6 is clockwisely rotated and the other end thereof releases the restraint of a surface cam 4. Therefore, a sector gear 8 is counter-clockwisely rotated by a spring 9 and in response thereto, the surface cam 4 is clockwisely rotated. On the other hand, an aperture control lever 3 is clockwisely biased by a spring 2, so that a pin 3d bears against the cam surface. Accordingly, by the rotation of the sector gear 8, the surface cam 4 rotates the control lever 3 clockwisely. When the control lever 3 is thus rotated clockwisely, an aperture lever 1 is also moved from the aperture open position of FIG. 3 in the stop-down direction (downwardly as viewed in the drawing) by the biasing force of a spring 2. Simultaneously therewith, a ratchet gear 12 is also rotated counter-clockwisely by a sector gear 3c secured to the control lever 3. When the aperture lever 1 is moved in the stop-down direction and an aperture 21 is stopped down to a predetermined aperture opening, the coil of a complex electromagnet Mg is momentarily electrically energized by an aperture control circuit A6 and the electromagnet negates the magnetic force of a permanent magnet to release the attraction of an armature 13b. Accordingly, a restraining lever 13 is clockwisely rotated by a biasing force and a restraining pawl 13a meshes with the ratchet gear 12, and this condition is maintained. By this meshing engagement, the control lever 3 and the aperture lever 1 are also stopped. In this manner, the aperture is adjusted to an aperture value for obtaining a proper exposure. On the other hand, the sector gear 8 still continues its counter-clockwise rotation and at the end of that rotation, it engages an exposure signal lever 10 to move it leftwardly. At this time, a switch $sw_2$ is closed at the initial stage of movement of the lever 10 and detects that the operation timing of the aperture control device is between the stop-down termination time and the shutter release time. At the termination of movement of the lever 10, a mirror is retracted out of the phototaking optical path by an unshown mechanism and subsequently, the shutter curtain is released and it is opened and closed in accordance with a preset shutter speed. A forward shutter curtain movement signal generating lever 16 is moved leftwardly upon start of the movement of the forward shutter curtain to close a switch $sw_3$. By the closing of this switch, the exposure start operation timing is detected. In this manner, the exposure operation is terminated. This condition is the condition shown in FIG. 4. When the exposure operation is terminated, the mirror is lowered back to its original position, namely, the observation position, and in response thereto, an unshown mechanism moves a mirror interlocking lever 14 rightwardly downwardly (as indicated by dots-and-dash line in FIG. 4). Accordingly, a restitution lever 15 is rotated counter-clockwisely against the biasing force and a pin 15a pushes up a plate spring 13c, whereby the restraining lever 13 is rotated counter-clockwisely against the biasing force of the plate spring. When the restraining lever 13 is rotated and the armature 13b is returned onto the complex electromagnet Mg, the armature 13b is again attracted and held by the permanent magnet of the complex electromagnet Mg (as indicated by dots-and-dash line in FIG. 4). Also, by the counter-clockwise rotation of the restitution lever 15, a pin 15b pushes up the control lever 3 and the aperture lever 1 is returned to the aperture open position (as indicated by dots-and-dash line in FIG. 4). Thereafter, when the wind-up operation such as film advance, shutter charge, mirror charge, etc. is effected by operating a film advance lever (not shown), a charge lever 11 is moved rightwardly and the sector gear 8 is clockwisely rotated against the biasing force. In accordance with this rotation, the surface cam 4 is rotated counter-clockwisely and, when the maximum radius portion thereof rides over the release interlocking lever 6, the release interlocking lever 6 drops into the minimum radius portion of the surface cam 4. Accordingly, after that, clockwise rotation of the surface cam 4 is blocked. In this manner, the wind-up operation is completed and the condition as shown in FIG. 3 is brought about.

Figure 5:
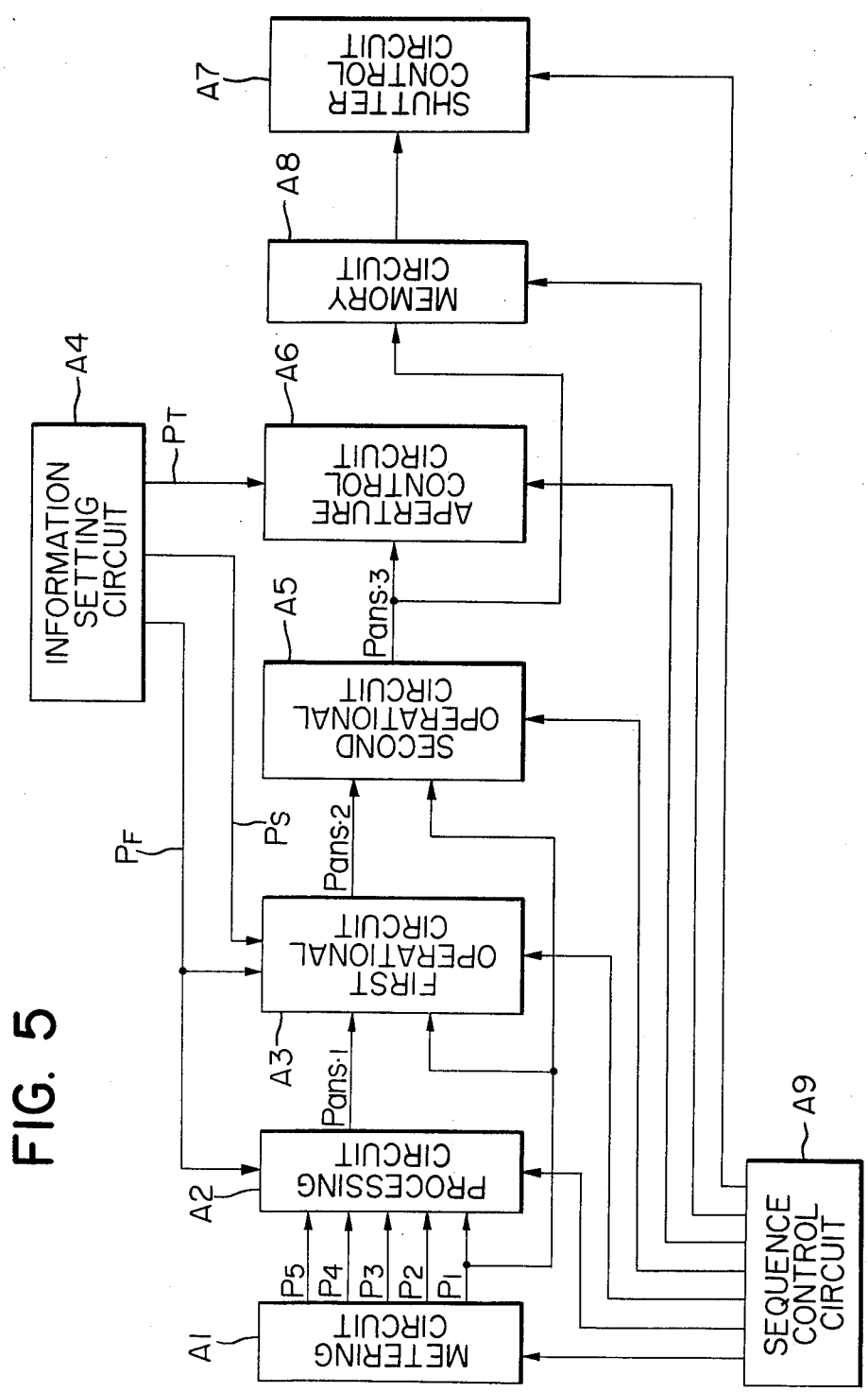
FIG. 5 is a block diagram showing the electric circuit construction according to a first embodiment of the present invention.

FIG. 5 is a block diagram showing the construction of the electric circuit according to a first embodiment of the present invention which prevents an aperture control failure resulting from an error between the metering output of the multimetering device and the output of the monitoring photoelectric element. In the following description, it is to be understood that the metering device is of the TTL open metering type.

A metering circuit $A_1$ includes the aforementioned photoelectric elements $PD_1$–$PD_5$ and before release, it effects metering while dividing the picture plane into a plurality of areas by the photoelectric elements PD$_1$–PD$_5$ and after release, it effects stop-down metering by the monitoring photoelectric element PD$_1$. The metering outputs P$_1$–P$_5$ of the photoelectric elements PD$_1$–PD$_5$ are applied to a processing circuit A$_2$ and the metering output P$_1$ of the monitoring photoelectric element PD$_1$ is branched and applied to first and second operational circuits A$_3$ and A$_5$ to be described. These metering outputs P$_1$–P$_5$, if represented by P$_n$, are an output which is P$_n$=B$_{v.n}$−A$_{vo}$ (B$_v$ is the APEX display value of the object brightness, and A$_{vo}$ is the APEX display value of the open F-value of the lens). The processing circuit A$_2$ processes the metering outputs P$_1$–P$_5$ in accordance with a predetermined program and as a result, operates and puts out a metering output best suited to the object conditions (this output is the aforementioned multimetering output). As to by what operation the processing circuit A$_2$ generates the multimetering output, the technique of the aforementioned Japanese Laid-open Patent Application Nos. 12827/1977 and 52419/1978 is mentioned as an example thereof.

An information setting circuit A$_4$ introduces exposure factors from the camera body or the lens (for example, an interchangeable lens) and transmits an output P$_S$=S$_v$ corresponding to film speed information (S$_v$ is the APEX display value of the film speed) to the first operational circuit A$_3$ and an output P$_F$=A$_{vo}$ corresponding to the open F-value of the lens to the processing circuit A$_2$ and the first operational circuit A$_3$, and further transmits an output P$_T$=T$_{v.preset}$ corresponding to a preset shutter speed (T$_v$ is the APEX display value of the shutter speed) to an aperture control circuit A$_6$. A sequence control circuit A$_9$ receives as input the ON and OFF signals of the switches sw$_1$–sw$_3$ described in connection with FIGS. 3 and 4, and discriminates between the operation timings of the automatic exposure control device and controls the operations of the circuits A$_3$ and A$_5$–A$_8$ in accordance with such operation timings.

Operation will now be described. First, before the release operation of the camera, the processing circuit A$_2$ which receives as input the metering outputs P$_1$–P$_5$ from the metering circuit A$_1$ resulting from the TTL open metering is putting out a multimetering output P$_{ans.1}$=B$_{v.ans}$ best suited to the object conditions. By this time, the processing circuit has already offset the component of open F-value A$_{vo}$ included in the metering outputs P$_1$–P$_5$ by the output P$_F$ from the information setting circuit A$_4$. Subsequently, the first operational circuit A$_3$ operates $$P_{ans.2} = P_{ans.1} - P_1 + P_S - P_F \qquad (1)$$
$$= B_{v.ans} - (B_{v.1} - A_{vo}) + S_v - A_{vo}$$
$$= B_{v.ans} - B_{v.1} + S_v$$

from the outputs P$_1$, P$_{ans.1}$, P$_S$ and P$_F$ and applies its output P$_{ans.2}$ to the second operational circuit A$_5$.

Subsequently, after the release operation, when the switch sw$_1$ becomes open, the first operational circuit A$_3$ holds P$_{ans.2}$ during the OFF condition of the switch S$_1$ under the control of the sequence control circuit A$_9$, and the aperture control circuit A$_6$ starts to operate. When the aperture 21 is stopped down by the aperture control mechanism, the metering output of the monitoring photoelectric element PD$_1$ becomes $$P_1 = B_{v.1} - A_v \qquad (2)$$

(A$_v$ is the F-value in the course of stop-down) and that output is varied in accordance with A$_v$. The second operational circuit A$_5$ receives as input this output P$_1$ and the output P$_{ans.2}$ held by the first operational circuit A$_3$ and operates $$P_{ans.3} = P_{ans.2} + P_1 \qquad (3)$$
$$= B_{v.ans} - A_{vn} + S_v = T_{v.n}$$

(T$_{v.n}$ is the APEX display value of the shutter speed determined by a variation in the F-value A$_{v.n}$ of the aperture in the course of the stop-down) and applies that output P$_{ans.3}$ to the aperture control circuit A$_6$. As the result of two operations having been effected by the first and second operational circuits A$_3$ and A$_5$, the output P$_{ans.3}$ represents the shutter speed determined by the multimetering output B$_{v.ans}$ and the aperture value A$_v$ during the stop-down. Thus, the difference between the output P$_1$ of the monitoring photoelectric element and the multimetering output P$_{ans.1}$ has been corrected.

The aperture control circuit A$_6$ controls T$_{v.n}$ with T$_{v.preset}$ and, when the stop-down progresses until T$_{v.n}$=T$_{v.preset}$, the aperture control circuit A$_6$ operates the complex electromagnet M$_g$ as previously described to thereby block the stop-down. The F-number of the aperture 21 at this time is a proper aperture value determined by T$_{v.preset}$, B$_{v.ans}$ and S$_v$.

Thereafter, when the operation sequence for aperture control is terminated and the switch sw$_2$ is closed, a memory circuit A$_8$ stores the output P$_{ans.3}$ of the second operational circuit A$_5$ after the aperture control, by the sequence control circuit A$_9$. When the forward shutter curtain is started and the switch sw$_3$ is closed, the sequence control circuit A$_9$ operates a shutter control circuit A$_7$. The shutter control circuit A$_7$ integrates the exposure time from the exposure start by the movement of the forward shutter curtain and, when the integration output comes to assume a predetermined relation with P$_{ans.3}$, it causes movement of the rearward shutter curtain. By the above-described operation, the exposure control operation is completed.

In the above-described construction, the film speed S$_v$ has been applied as input to the first operational circuit A$_3$, but this may be applied as input to the second operational circuit A$_5$ or may be applied as input to the aperture control circuit. This is because it suffices if T$_{v.n}$ is generated at the stage whereat it is compared with T$_{v.preset}$.

Figure 6A:
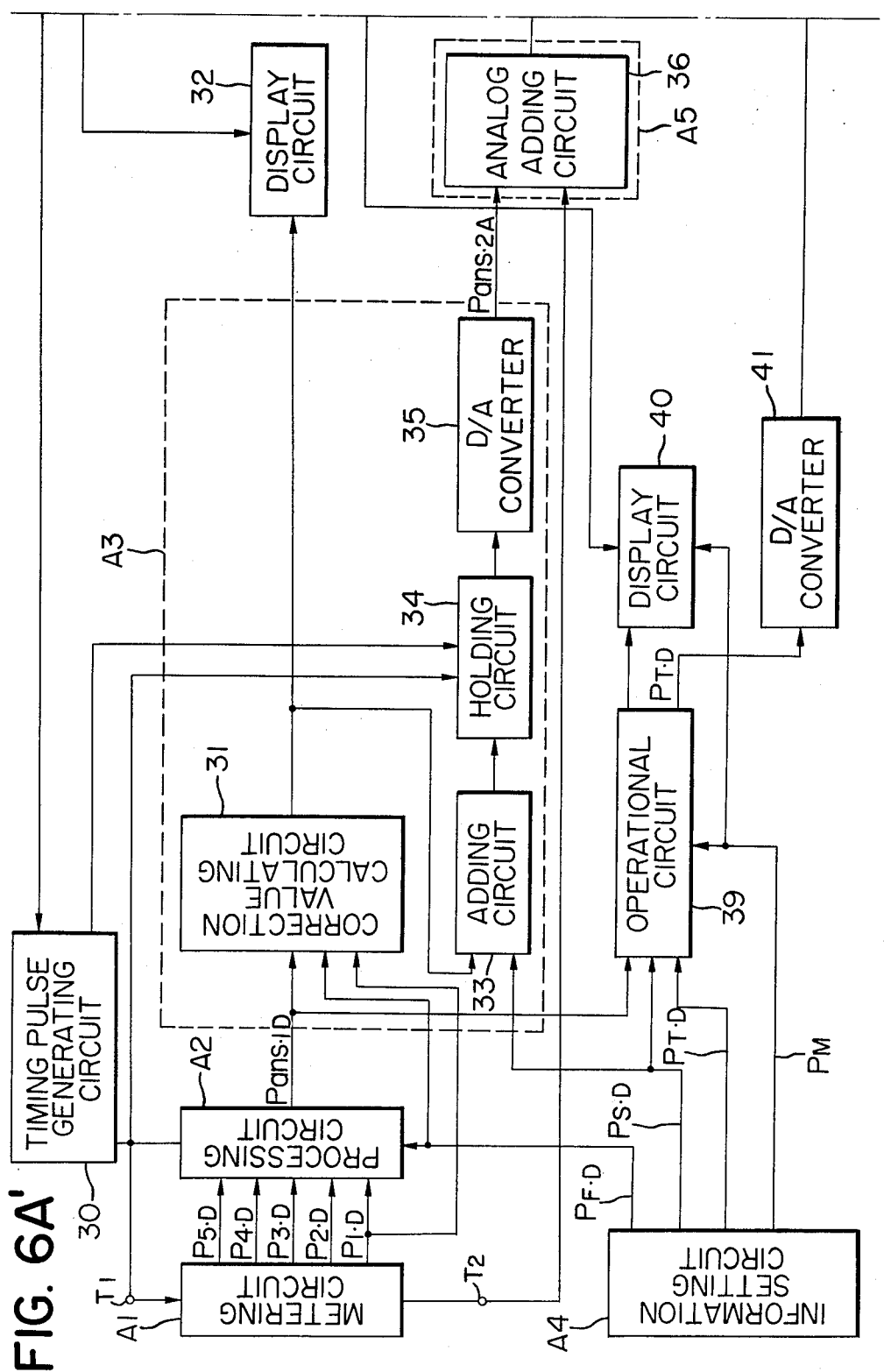
FIGS. 6A, 6A', 6A" and 6B show a first circuit example of the first embodiment.

FIG. 6a shows a more specific example of the circuit according to the first embodiment of the present invention, and FIG. 7 is a timing chart showing the output waveform of each circuit. In the following, the shutter first exposure control operation will first be described. A timing pulse generating circuit 30 generates clock pulses of a predetermined period (FIG. 7a) and reset pulses of a predetermined period (FIG. 7a'). The reset pulses are generated immediately before the clock pulses are generated. A control circuit 29 sequence-controls predetermined circuits so that these circuits are operated in accordance with the operation sequence of stop-down control. The circuits 29 and 30 together constitute the sequence control circuit A$_9$.

Figure 6B:
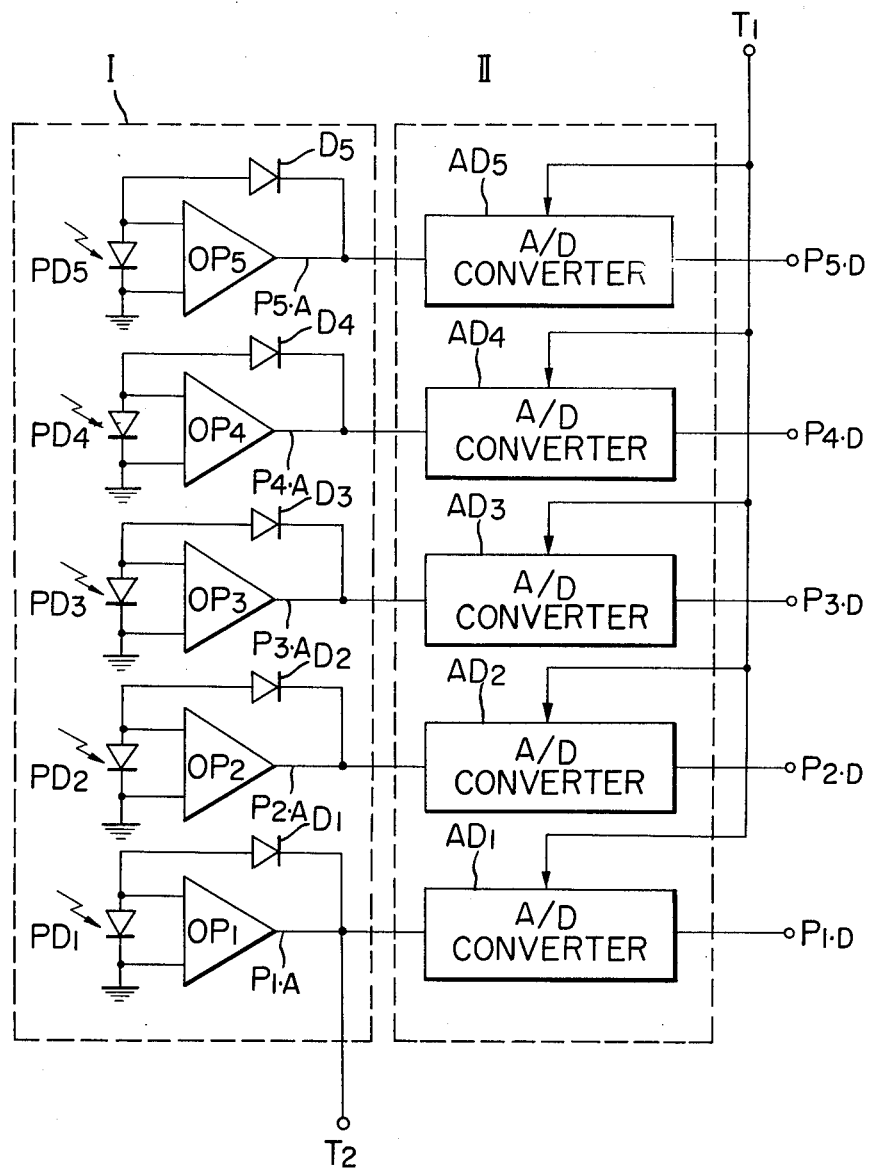

A metering circuit A$_1$ is constructed as shown in FIG. 6b. The number N (N=5) of photodiodes PD is determined by the number of the metering areas into which the picture plane is divided, and the respective photodiodes are connected to operational amplifiers OP$_1$–OP$_5$. The respective operational amplifiers generate the metering outputs $P_{1.A}, P_{2.A}, \ldots P_{5.A}$ (the suffix A means analog) of the photodiodes logarithmically compressed by log diodes $D_1-D_5$. These metering outputs are representatively shown by the output $P_{1.A}$ of the photodiode $PD_1$ in FIG. 7b. What has been described above constitutes a photoelectric converting system I. At this time, if attention is paid to a metering output which is good in linearity even if the aperture is stopped down, the metering output of that photodiode which meters the central portion of the picture plane (here, $PD_1$) applies to this. This photodiode $PD_1$ acts also as a monitoring photoelectric element. Subsequently, the analog metering outputs of the photodiodes $PD_1-PD_5$ are applied to the A/D converters $AD_1-AD_5$ of an A/D converting system II, by which they are converted into digital outputs $P_{1.D}-P_{5.D}$ (the suffix D means digital). The A/D converting system II receives as input the clock pulses (FIG. 7a) of a predetermined period from the timing pulse generating circuit 30 through a terminal $T_1$, and repeats A/D conversion at each predetermined period.

For the sake of description, it is assumed that if 0.08 lx is 0[Bv] and 8-bit A/D conversion is effected with $P_{1.A}=12.5$ [Bv], the digital metering output $P_{1.D}$ is represented by a binary number 1100.1000. Such digital output is shown in FIG. 7c. Photodiodes $PD_2-PD_5$ are also processed in the same manner. The photoelectric converting system I and the A/D converting system II constitute the metering circuit $A_1$. In the case of the TTL open metering, the outputs $P_{1.A}-P_{5.A}$ and $P_{1.D}-P_{5.D}$ include the open F-value information $A_{vo}$ of the lens.

Next, the A/D-converted metering outputs $P_{1.D}-P_{5.D}$ are applied to the processing circuit $A_2$. On the other hand, an information setting circuit $A_4$ applies to the processing circuit $A_2$ an output $P_{F.D}$ which results from digitalizing the open F-value information $A_{vo}$ of the lens (for example, if $A_{vo}=2$, the output $P_{F.D}$ is represented by a binary number 0010.0000). The processing circuit $A_2$ repeats such operation that it once memorizes the metering outputs $P_{1.D}-P_{5.D}$ for the first clock pulse of FIG. 7a, processes these outputs for the next clock pulse in accordance with a predetermined program and generates a digitalized multimetering output $P_{ans.1D}=-B_{vans.D}$. If this multimetering output $B_{vans.D}=11.5$, it is represented by a binary number 1011.1000. This is shown in FIG. 7d.

The multimetering output $B_{vans.D}$ from the processing circuit $A_2$, the open F-value information $P_{F.D}=A_{vo.D}$ from the information setting circuit $A_4$ and the digital metering output $P_{1.D}=B_{v1D}-A_{vo.D}$ of the monitoring photodiode $PD_1$ from the A/D converter $AD_1$ are applied to a correction value circulating circuit 31, which calculates $P_{ans.1D}-F.D.-P_{1.D}=B_{vans.D}-B_{v1.D}$. Since $A_{vo}=2$ as already noted, this output becomes $-3[B_v]$ and is represented by a binary number 1101.0000 (the first bit represents minus). This output is shown in FIG. 7e.

The output of the correction value calculating circuit 31 is displayed as the difference between the multimetering output and the monitoring photoelectric output by a display circuit 32 while, at the same time, it is applied to an adding circuit 33. The adding circuit 33 adds together the digitalized film speed information $P_{S.D}=S_{V.D}$ from the information setting circuit $A_4$ and the output from the correction value calculating circuit 31 and resultantly generates an output $P_{ans.2D}$ which results from the digital addition of the aforementioned equation (1). If the film speed $S_v=0$ at this time, the output of the adding circuit 33 is the same as the output of the correction value calculating circuit 31. The above-described operation is completed within the period of the first and second clock pulses of FIG. 7a. When the second clock pulse is generated, $P_{ans.2D}$ is held by a holding circuit 34. Since the output of the adding circuit 33 is now represented by a binary 1101.0000, the parallel outputs corresponding to the first, second and fourth bits of the holding circuit are 1 and the others are 0. The output of the first bit of these parallel outputs is representatively shown in FIG. 7f. This output is reset by a reset pulse (FIG. 7a') immediately before a clock pulse enters, and is set by new information for the subsequent clock pulse.

By D/A-converting each bit output of the holding circuit by a D/A converter 35, a real time analog output $P_{ans.2A}=B_{vans.A}-B_{v.1A}+S_{v.A}$ is generated as shown in FIG. 7g. The above-described circuits 31 and 33-35 together constitute the first operational circuit $A_3$. Now, $-3$[EV] is shown in analog quantity. When this output and the output $P_{1A}$ of the monitoring photodiode $PD_1$ put out from the terminal $T_2$ of FIG. 6b are applied to an analog adding circuit 36 (the second operational circuit $A_5$), the operation of equation (3) ($A_{v.n}=A_{vo}$) is carried out to obtain the output as shown in FIG. 7h. In the open aperture condition, $T_{v.n}=9.5$. However, the section from the start of the metering until the second clock pulse is generated is in a condition in which no correction value is added and therefore, a proper exposure value cannot be put out. Therefore, such sequence control is adopted that shutter release cannot be effected until the circuit is stabilized by the application of the power source resulting from the first stroke of the release operation and two clock pulses are counted. By the above-described step, the steps up to the metering are completed.

On the other hand, when a mode selector (not shown) detects the shutter first mode, the information setting circuit $A_4$ causes an operational circuit 39 which receives as input the digital output $P_{T.D}$ of a preset shutter speed, the digital output $P_{S.D}$ of the film speed and the multimetering output $P_{ans.1D}$ from the processing circuit $A_2$ to calculate an aperture value from the three bits of information, to apply it to a display circuit 40 and to apply the output $P_{T.D}$ to a D/A converter 41. Thus, the display circuit 40 displays an aperture value controlled by the multimetering output, and the correction value display circuit 32 displays a correction stage number for the aperture value controlled by the output of the monitoring photodiode $PD_1$. By this, it becomes possible to grasp the tendency of the brightness in the picture plane and accordingly, to have the intention of the photographer reflected in the photography.

Next, when release is effected (the second stroke), the supply of power to the correction value display circuit 32 and the display circuit 40 is stopped. The control circuit 29 causes the timing pulse generating circuit 30 to stop generating clock pulses and reset pulses. Thereupon, the output of the holding circuit 34 is memorized. Next, the aperture of the lens is stopped down by the above-described aperture control mechanism and the output of the monitoring photodiode $PD_1$ is reduced as shown by equation (2). Likewise, the output of the analog adding circuit 36 is also reduced correspondingly. This takes place within the time period $\tau_1$ from the release till the stop-down restraint indicated in FIGS. 7a and 7h.

In the case of the shutter speed first mode, the aperture control circuit $A_6$ compares an analog output $T_{v.preset.A}$ introduced from the information setting circuit $A_4$ and corresponding to the preset shutter speed with the output $P_{ans.3A}$ of the analog adding circuit 36 and restrains the stop-down when the relation of equation (3) is established. Actually, it somewhat differs from the set $T_v$ value due to a mechanical delay, but the metering value varies by that amount and therefore, this is applied to the memory circuit $A_8$ is memorized thereby immediately before the mirror is moved upwardly, and at that value, the opening-closing of the shutter is controlled in the shutter control circuit $A_7$.

In this example of the circuit, programmed exposure control is also possible. When the mode selector detects that the program mode is selected, the information setting circuit $A_4$ generates the output PM to control the operational circuit 39 so as to apply a shutter speed following the exposure control program to the display circuit 40 and the D/A converter 41. This exposure control program is for determining a combination of the shutter speed and the aperture in accordance with the object brightness, here, the output $B_{vans.D}$ provided from the processing circuit $A_2$, and only a combination of one shutter speed and aperture can be obtained for a certain object brightness. That is, a manually preset shutter speed is automatically set by the brightness. The display circuit 40 displays the shutter speed following the program, and the aperture control circuit $A_6$ stops down the aperture until the output of the analog adding circuit 36 and the output of the D/A converter 41 assume a predetermined relation. The other operations are the same as those described previously.

Figure 8A:
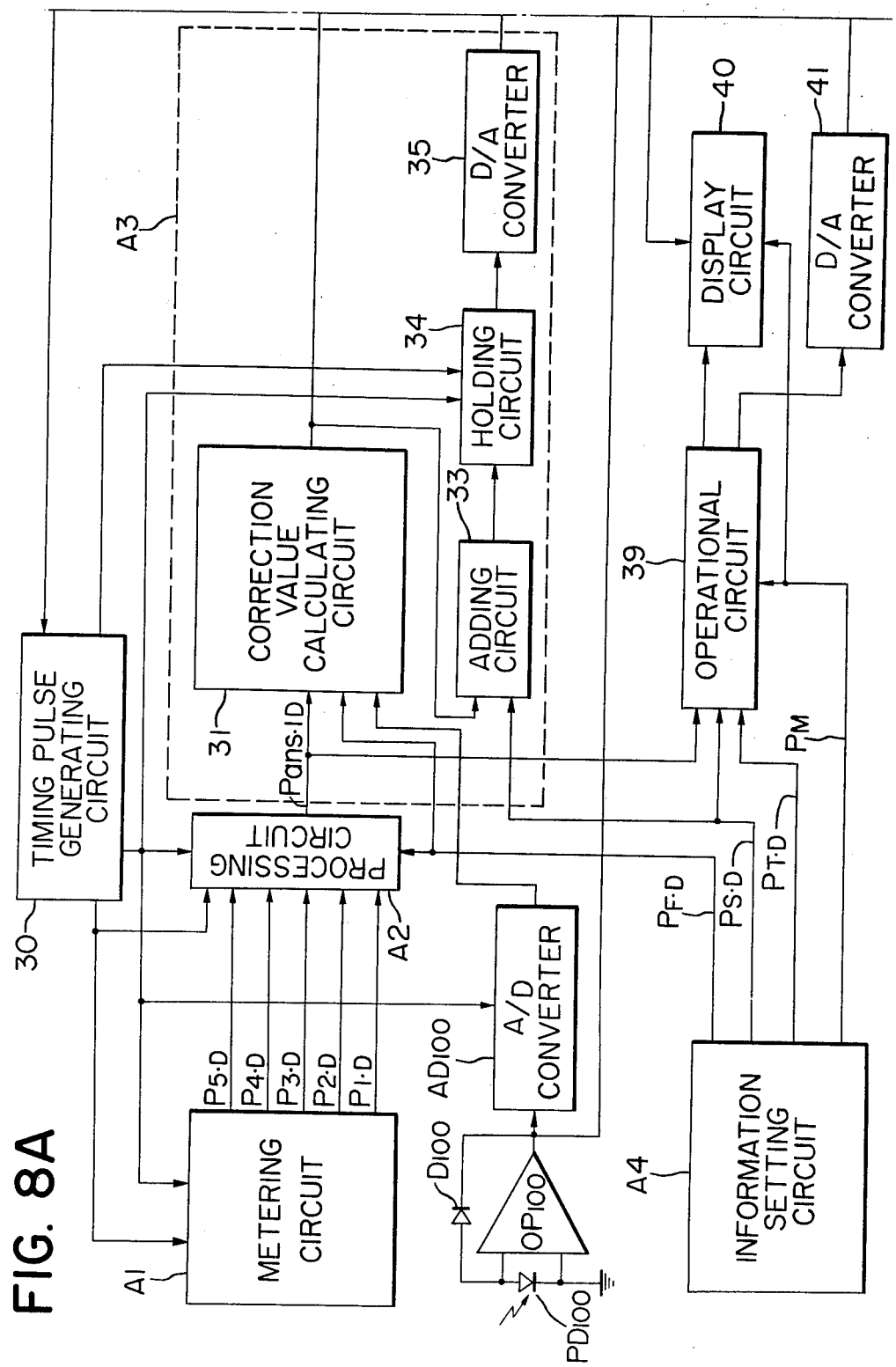

FIG. 8 shows another example of the circuit. In this embodiment, a monitoring photodiode $PD_{100}$ is designed to receive the light reflected by the shutter curtain surface and/or the film surface, and this photodiode is provided separately from the photodiodes of the photoelectric converting system I. During the mirror-down position (during the observation), this photodiode $PD_{100}$ meters the object light reflected by the shutter curtain surface through the half-mirror 22a (FIG. 1) near the center of the mirror (for the purpose of correction value display), and during the mirror-up position (during the photography), it directly meters the object light reflected by the shutter curtain surface and/or the film surface. The metering deviation resulting from whether or not the metering is effected through the half-mirror 22a during the mirror-down and during the mirror-up position can be allowed for in the correction amount in advance.

Now, in FIG. 8, the analog metering output of the photodiode $PD_{100}$ is converted into a digital output by an A/D converter $AD_{100}$, and the digital output is applied to a correction value calculating circuit 31, and the analog metering output is applied to an analog adding circuit 36. Even during the mirror-down position, the correction value calculating circuit 31 calculates the correction value and a display circuit 32 displays the correction value. In this embodiment, the memory circuit $A_8$ is unnecessary and the other operations are the same as those described in connection with the FIG. 6 embodiment.

Figure 9A:
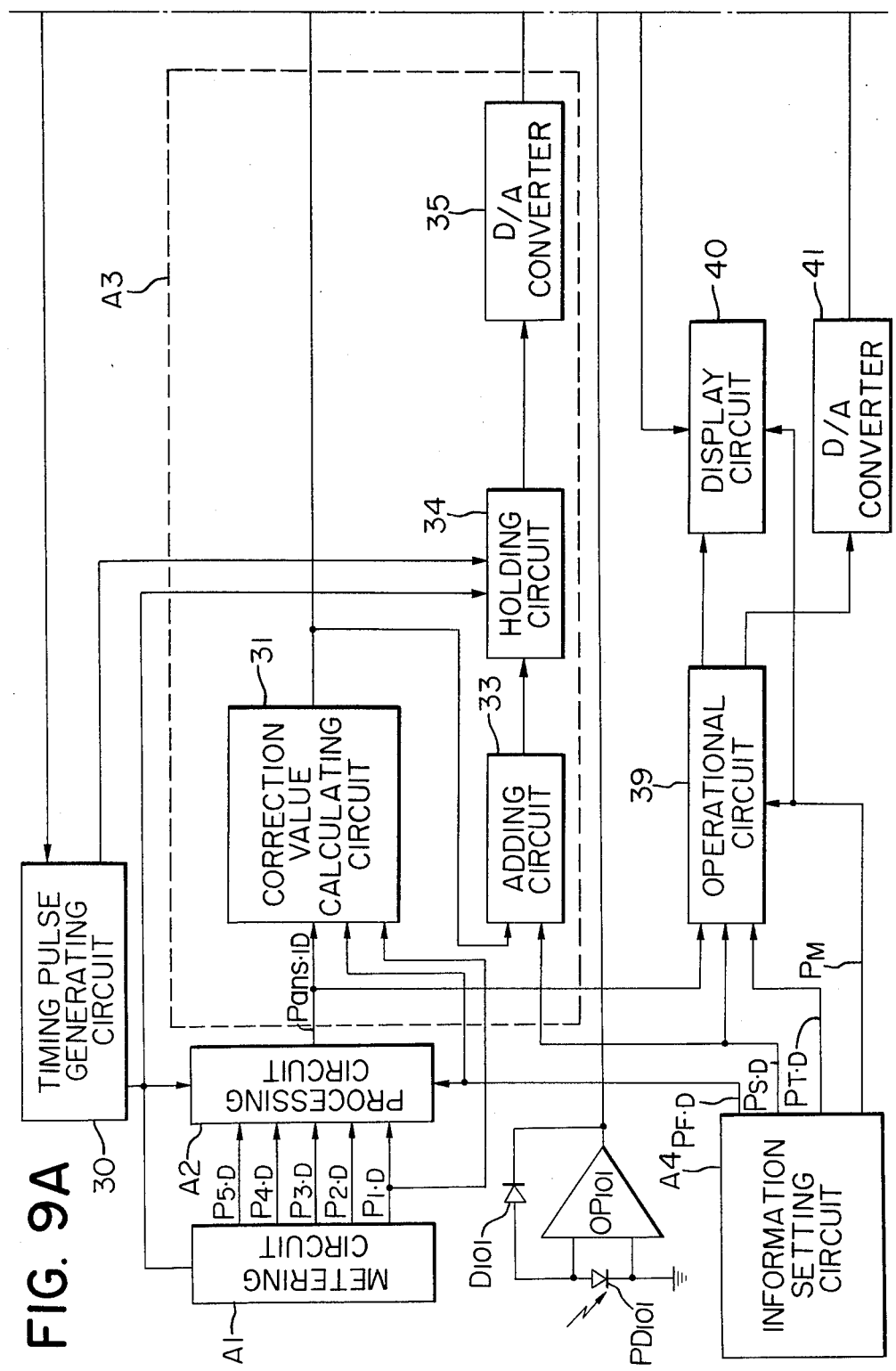

FIG. 9 shows still another example of the circuit. This embodiment is designed such that the metering output of the photodiode $PD_1$ of the photoelectric converting system I is digitalized by an A/D converter $AD_1$ and applied to a processing circuit $A_2$ and a correction value calculating circuit 31, whereby the correction value is calculated and displayed, and further, as the monitoring photodiode, use is made of a photodiode $PD_{101}$ which meters the light reflected by the shutter curtain surface and/or the film surface after the mirror-up position, and this analog metering output is put out to an analog adding circuit 36 to thereby obtain the analog output of equation (3) during the stop-down metering control. In this case, the metering area of the photodiode $PD_1$ and the metering area of the photodiode $PD_{101}$ must be made substantially identical to each other. In this embodiment, the memory circuit $A_8$ of FIG. 6a is unnecessary.

Description will now be made of a second embodiment of the present invention which is designed so as to display the difference between the metering output of the multimetering device and the output of the monitoring photoelectric element. FIG. 10 is a block diagram showing the basic construction of the second embodiment of the present invention. As in the first embodiment, the photoelectric output from the metering circuit is applied to a processing circuit which generates a multimetering output (a first metering output) $P_{ans.1}$. The output $P_1$ of the photoelectric element (called a second metering output) and the first metering output are applied to a differential circuit, which detects the difference between the first metering output and the second metering output. This difference is displayed by a first display circuit. If the first metering output $P_{ans.1}$ and the second metering output $P_1$ are expressed by APEX display values, the difference therebetween indicates how much over- or under-exposed is the picture plane whose exposure is adjusted by the first metering output with respect to the center of the picture plane. Also, this differential circuit may display the difference between the average value (for example, the mean value or the median value) $P_{mean}$ of a plurality of metering outputs obtained from the processing circuit and the first metering output $P_{ans.1}$. In this case, whether the picture plane is high key or low key can be judged.

An APEX operational circuit receives as input the first metering output $P_{ans.1}$ and the exposure factors from the information setting circuit, for example, shutter speed and film speed in case of the shutter first mode, and aperture value and film speed in case of the aperture first mode, and operates a proper aperture value or a proper shutter speed, respectively. The operation output is concretely displayed as an aperture value or a shutter speed by a second display circuit. In order that the aforementioned difference may be concretely displayed as an aperture value or a shutter speed by the first display circuit, a subtracting circuit for subtracting the output of the differential circuit and the output of the APEX operational circuit must be provided and the first display circuit must display the output of this subtracting circuit. That is, the APEX operation output is corrected by the output of the differential circuit for an amount corresponding to said difference.

Figure 11:
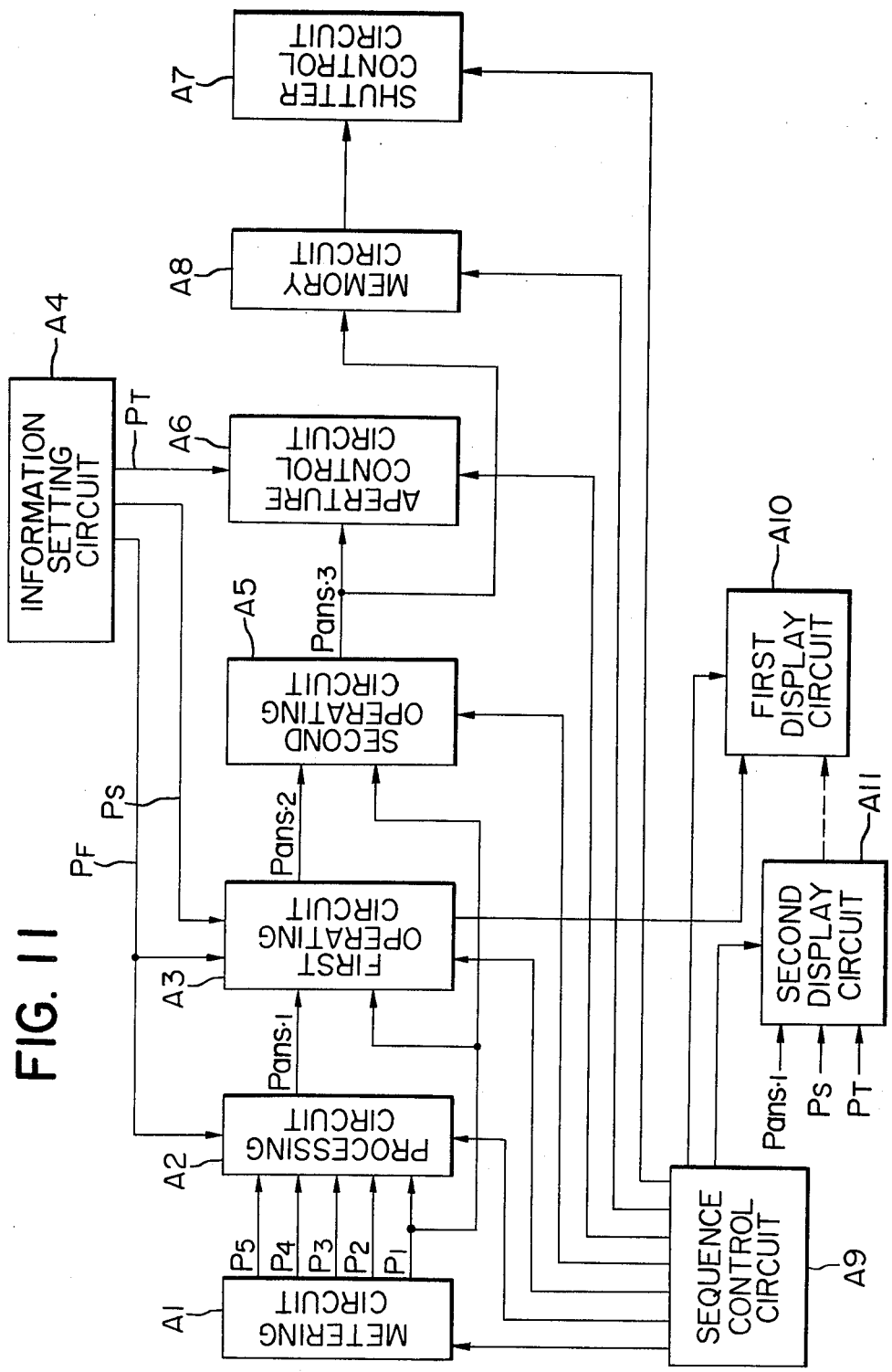
FIG. 11 is a block diagram showing the electric circuit construction of the second embodiment.

FIG. 11 is a block diagram showing the construction of the electric circuit of the second embodiment, in which a first display circuit $A_{10}$ and a second display circuit $A_{11}$ are added to the construction of FIG. 5. The first display circuit $A_{10}$ receives as input another output $B_{vans} - B_{v1}$ ($= P_{ans.1} - P_1 - P_F$) of the first operational circuit $A_3$ and displays the difference between the multimetering output $P_{ans.1}$ and the output $P_1$ of the monitoring photoelectric element, for example, in the form of correction stage number. (Here, $B_{vans}$ is the APEX display value of $P_{ans.1}$.) Accordingly, it is possible to confirm by how many stages the aperture value controlled by the multimetering output is deviated if converted into the central portion of the picture plane and as a result, it is possible to grasp with which brightness of object in the picture plane the exposure matches. The second display circuit $A_{11}$ receives as input the multimetering output $P_{ans.1}$ from a processing circuit $A_2$ and an output $P_T$ corresponding to a predetermined shutter speed and an output $P_S$ corresponding to the film speed from an information setting circuit $A_4$, and operates a proper aperture value determined by these outputs $P_{ans.1}$, $P_T$ and $P_S$ and displays the same.

Before the release operation of the camera, the processing circuit $A_2$ puts out a multimetering output $P_{ans.1} = B_{vans}$ best suited for the conditions of the object, and a first operational circuit $A_3$ operates the aforementioned equation (1) and puts out an output $P_{ans.1}$.

First, the second display circuit $A_{11}$ receives as input the multimetering output $P_{ans.1}$, the output $P_T$ corresponding to a preset shutter speed and the output $P_S$ corresponding to the film speed and operates $$P_{ans.1} + P_S - P_T = B_{v.ans} + S_v - T_{v.preset} \quad (4)$$
$$= A_{v.ans}$$

($A_{v.ans}$ is a proper aperture value corresponding to $B_{v.ans}$) and displays $A_{v.ans}$. On the other hand, the first display circuit $A_{10}$ receives as input the output of the first operational circuit $A_3$, namely, $B_{v.ans} - B_{v1}(B_{v.diff})$ and, if it directly displays it, it can display the exposure correction stage number for the center of the picture plane (FIGS. 16a and 16b).

Also, if it receives the output $A_{v.ans}$ of the second display circuit $A_{11}$ and operates $$A_{v.ans} - (B_{v.ans} - B_{v1}) = B_{v1} + S_v - T_{v.preset} \quad (5)$$
$$= A_{v.com}$$

($A_{v.com}$ is an aperture value corresponding to $B_{v1}$). then $A_{v.ans}$ and $A_{v.com}$ can be displayed in the same manner, as shown in FIG. 16c.

In this manner, the proper aperture value and the difference between the aperture value for the object in the center of the picture plane and said proper aperture value (if $P_{mean}$ is used instead of $P_1$, the difference from the aperture value based on the average brightness) are displayed, so that the photographer can know in advance the situation of the exposure control for the picture plane. If required, the photographer can have his photographing intention reflected in the exposure control as by changing the film speed.

Figure 12A:
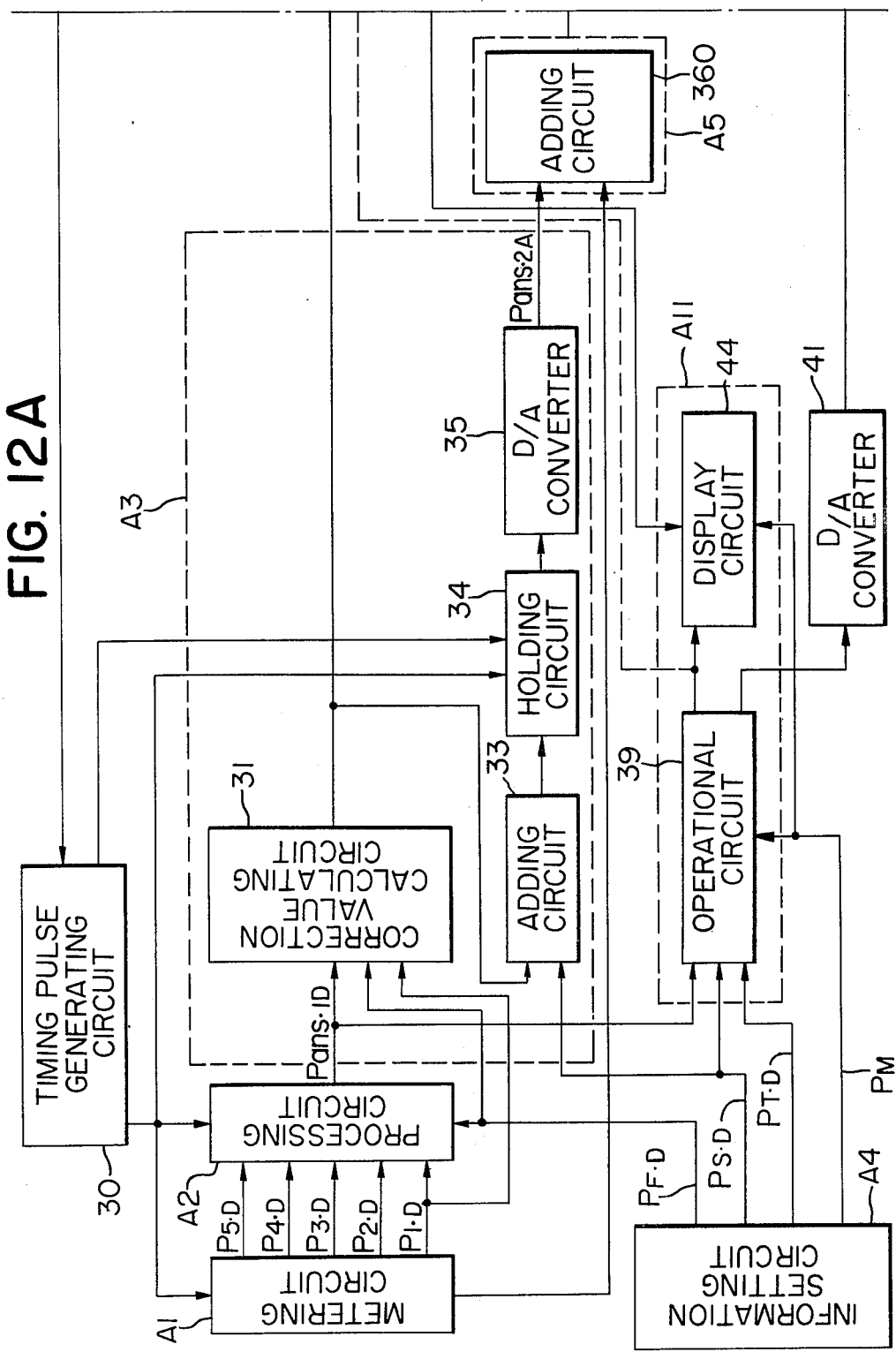

Reference is now had to FIG. 12 to describe a more specific example of the circuit according to the second embodiment.

During the shutter first mode, an operational circuit 39 receives as input the output corresponding to $S_v$, $T_v$ from an information setting circuit $A_4$ and the multimetering output $B_{v.ans}$ from a processing circuit $A_2$ and effects the operation expressed in equation (4) and applies $A_{v.ans}$ to a subtracting circuit 43 and a display circuit 44. The subtracting circuit 43 subtracts the outputs $B_{v.ans} - B_{v.1}$ and $A_{v.ans}$ of a correction value calculating circuit and effects the operation of equation (5). An aperture value $A_{v.com}$ based on $B_{v.1}$ is displayed by a display circuit 45. In a construction wherein the subtracting circuit 43 is absent, $B_{v.ans} - B_{v.1}$ is directly displayed as a correction stage number. The output $A_{v.ans}$ is displayed by a display circuit 44. Circuits 43 and 45 constitute a first display circuit $A_{10}$, and circuits 39 and 44 constitute a second display circuit $A_{11}$.

Assuming that the shutter speed is preset, for example, to 1/60 sec. ($T_v = 6$), $T_{v.preset}$ is represented by a binary code 0110.0000. Accordingly, from equation (4), $A_{v.ans}$ is represented by a binary code 0101.1000 and from equation (5), $A_{v.com}$ is represented by a binary code 1000.1000, and these binary codes are decoded and visibly displayed by the display circuits 44 and 45.

During the shutter first mode, the operational circuit 39 applies $T_{v.preset}$ to a D/A converter 41.

Figure 13:
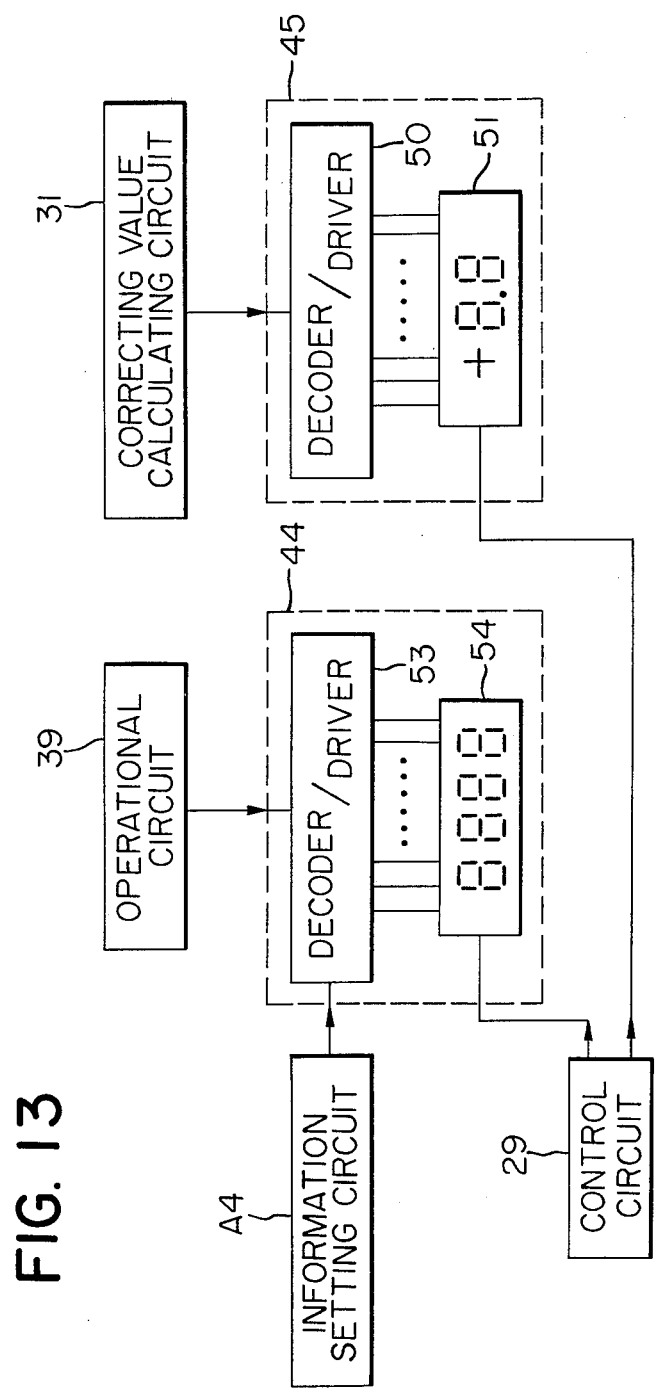
FIG. 13 shows an embodiment of display circuits 44, 45.

FIG. 13 shows an embodiment of display circuits 44, 45. The display circuit 45 comprises a decoder/driver 50 and a segment displayer 51. The decoder/driver 50 receives as input $B_{v.diff}$ from the correction value calculating circuit 31 and decodes the same. It drives the segment displayer 51 to cause it to display how many stages $A_{v.com}$ is over or under with respect to $A_{v.ans}$. The ON and OFF of the display of the segment displayer 51 is controlled by the signal from the control circuit 29, as previously described.

The display circuit 44 comprises a decoder/driver 53 and a segment displayer 54. The decoder/driver 53 converts the input from the operational circuit 39 so that the aperture value or the program shutter speed can be displayed by the mode select signal from the information setting circuit $A_4$, and drives the segment displayer 54 in accordance with each mode. The ON and OFF of the display of the segment displayer 54 is controlled by the signal from the control circuit 29.

The segment displays of the displayers 51 and 54 appear within the viewfinder as shown in FIG. 16a. The sign [5,6] is the display by the segment displayer 54, and the sign [+2] is the display by the segment displayer 51. The sign [8] represents the preset shutter speed.

Figure 14:
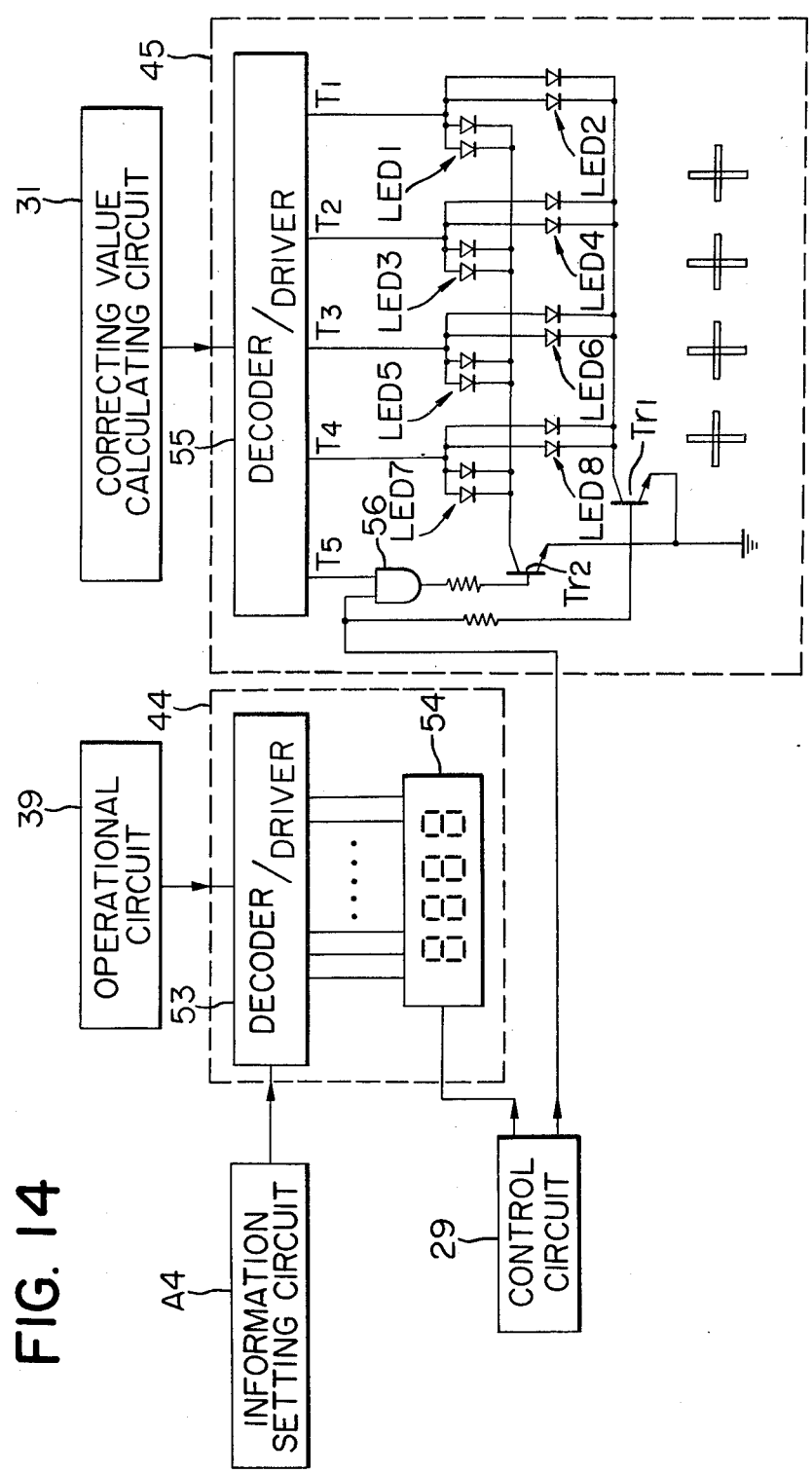
FIG. 14 shows another embodiment of display circuits 44, 45.

FIG. 14 shows another embodiment of display circuits 44, 45. The output $B_{v.diff}$ of the correction value calculating circuit 31 is applied as input to a decoder/driver 55. When this output $B_{v.diff}$ corresponds to one stage of the aperture value, terminal $T_1$ assumes a logic value "1", and when the output $B_{v.diff}$ corresponds to two stages, three stages, . . . , terminals $T_2$, $T_3$, . . . assume a logic value "1", respectively. Terminal $T_5$ assumes a logic value "1" when $B_{v.diff}$ is positive, and assumes a logic value "0" when $B_{v.diff}$ is negative. When the control circuit 29 receives a display operation instructing signal (logic value "1"), transistor $T_{r1}$ is turned on and, when terminal $T_5$ assumes "1", and AND gate 56 puts out "1" and turns on transistor $T_{r2}$.

Now, if the output $B_{v.diff}$ of the circuit 31 is positive, the transistors $T_{r1}$ and $T_{r2}$ are turned on and light-emitting diodes $LED_1$, $LED_3$, $LED_5$, $LED_7$ (each two of which form one set) connected between each output terminal of the decoder/driver 55 and the collector of the transistor $T_{r2}$ and light-emitting diodes $LED_2$, $LED_4$, $LED_6$, $LED_8$ (each two of which form one set) connected between each output terminal of the decoder/driver 55 and the collector of the transistor $T_{r1}$ all emit light and display (+) in accordance with the number of the terminals which are putting out "1". If $B_{v.diff}$ is negative, only the transistor $T_{r1}$ is turned on and the light-emitting diodes $LED_2$, $LED_4$, $LED_6$, $LED_8$ display (−) in accordance with the number of the terminals which are putting out "1". The display circuit 44 is the same as that shown in FIG. 13. The displays of the light-emitting diodes $LED_1$-$LED_8$ appear within the viewfinder of the camera in the manner as shown in FIG. 16b. That is the signs (+) or (−) represent over or under and the number thereof indicates the stage number.

Figure 15:
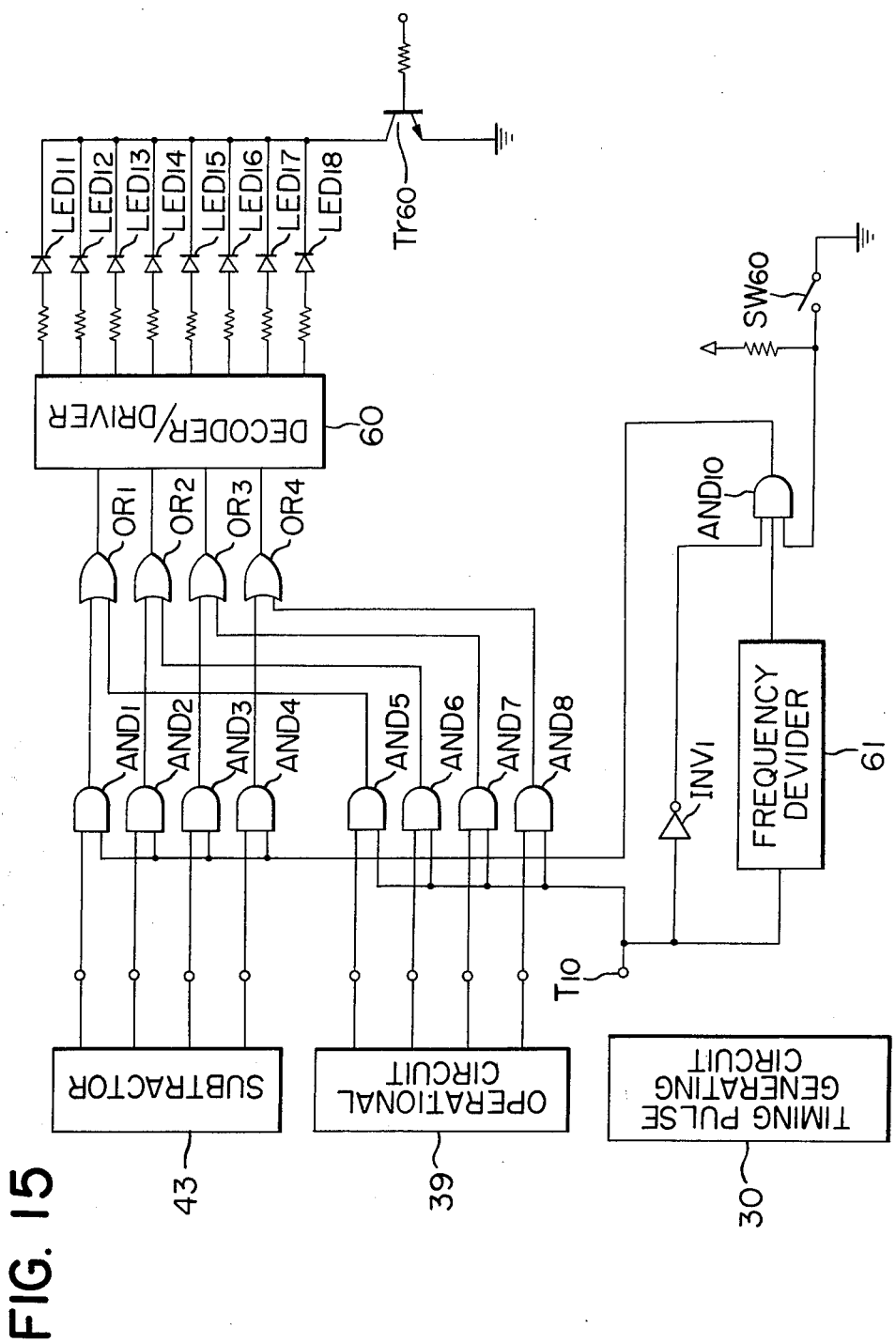
FIG. 15 shows still another embodiment of display circuits 44, 45.

FIG. 15 shows another embodiment of display circuits 44, 45. In this embodiment, $A_{v.ans}$ and $B_{v.diff}$ are displayed in 4 bits and places of decimals are discarded.

Now, each bit output of a binary coded output $A_{v.com}$ is applied from a subtracting circuit 43 to AND gates $AND_1$-$AND_4$. Each bit output of a binary coded output $A_{v.ans}$ is applied from an operational circuit 39 to AND gates $AND_5$-$AND_8$. OR gates $OR_1$-$OR_4$ receive as input the outputs of each one set of AND gates $AND_1$, $AND_5$; $AND_2$, $AND_6$; ... and apply their OR outputs to a decoder/driver 60. Light-emitting diodes $LED_{11}$-$LED_{18}$ opposed to the aperture value divisions of the lens as shown in FIG. 16c are connected to the decoder/driver 60. A frequency divider 61 makes different the periods at which the AND gates $AND_1$-$AND_4$ and $AND_5$-$AND_8$ are opened.

Now, when $A_{v.com}$ is represented by a binary code 0110 and one input of each of AND gates $AND_2$ and $AND_3$ assumes "1" and $A_{v.ans}$ is represented by a binary code 0101 and one input of each of AND gates $AND_6$ and $AND_8$ assumes "1"; and when terminal $T_{10}$ assumes "1" with the clock pulse from the circuit 30 applied thereto, AND gates $AND_5$-$AND_8$ are opened and so, OR gates $OR_2$ and $OR_4$ put out "1". The decoder 60 receives the binary code 0101 which is the outputs of OR gates $OR_1$-$OR_4$ and causes the light-emitting diode $LED_{15}$ corresponding to the aperture value (F=5.6) in FIG. 16c to emit light. At this time, an inverter $INV_1$ is putting out "0" and so, the output of the AND gate $AND_{10}$ is "0". Therefore, the AND gates $AND_1$-$AND_4$ are closed.

Next, when the application of the clock pulse to terminal $T_{10}$ is ceased and this terminal assumes "0", the output of the inverter $INV_1$ becomes "1" and, when the output of the frequency divider 61 is "1", the AND gate $AND_{10}$ puts out "1" and opens the AND gates $AND_1$-$AND_4$. Therefore, the outputs of the OR gates $OR_2$ and $OR_3$ become "1" and accordingly, the decoder/driver 60 which receives as input the binary code 0110 of the OR gates $OR_1$-$OR_4$ causes the light-emitting diode $LED_{16}$ corresponding to the aperture value (F=8) in FIG. 16c to emit light.

This operation is repeated by the application of the clock pulse, but due to the action of the frequency divider 61, the period at which the AND gates $AND_1$-$AND_4$ are opened is longer than the period at which the AND gates $AND_5$-$AND_8$ are opened and therefore, the light-emitting diode $LED_{15}$ for displaying $A_{v.ans}$ (F=5.6) can be visually continuously observed while, on the other hand, the light-emitting diode $LED_{16}$ for displaying $A_{v.com}$ (F=8) can be visually intermittently observed. By thus displaying $A_{v.ans}$ and $A_{v.com}$ so as to correspond to the aperture value divisions, the aperture stage number of the difference therebetween can be visually judged. when switch $SW_{60}$ is closed, an output "0" is always applied to the AND gates through the switch $SW_{60}$ and therefore, the display of $A_{v.com}$ can be extinguished. When the control circuit 29 is putting out a display instruction, transistor $T_{r60}$ is turned on to enable the light-emitting diodes to be turned on and, when a display interrupt instruction comes, it is turned off to make turn-on of the light-emitting diodes impossible.

A third embodiment of the present invention will now be described. This embodiment is an example in which one of the plurality of photodiodes of the multimetering device which is used for the monitoring of the stop-down (for example, one that corresponds to the center of the phototaking picture plane) is used as the ordinary part metering photoelectric element so that change-over can be easily effected between the multimetering system and the ordinary part metering system. The photoelectric element SPD used in this embodiment is disposed in the metering optical system of the camera, as shown in FIG. 17, and has a light-receiving surface patter as shown in FIG. 18. That is, the light-receiving surface is constructed by fifteen photodiodes $SPD_1$-$SPD_{15}$ in such a manner that the photodiode $SPD_8$ is disposed so as to correspond to the central area of the phototaking picture plane.

Figure 19A:
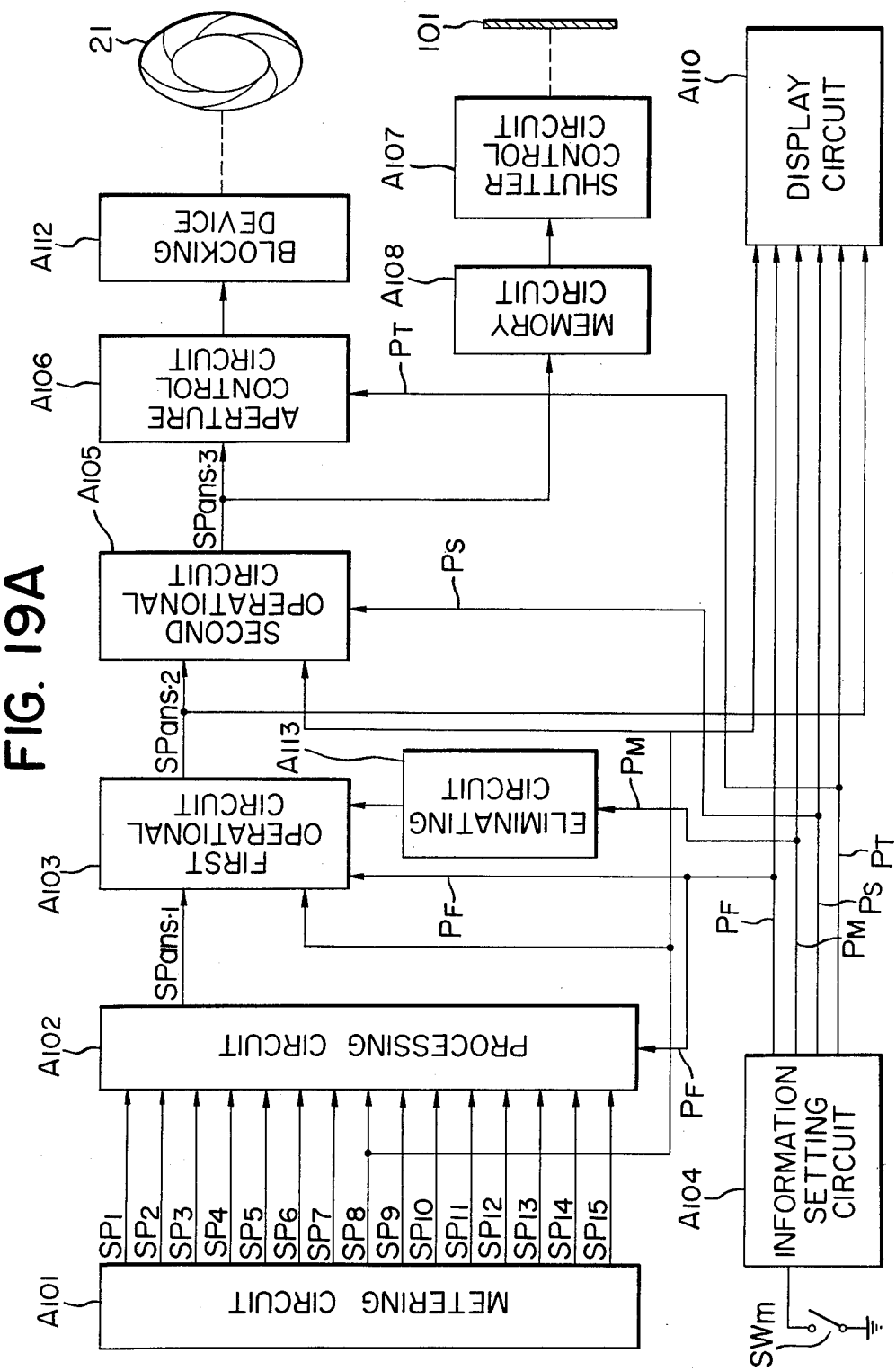
FIG. 19a shows a first circuit example of a third embodiment of the present invention.

A circuit example of the third embodiment will be described with reference to FIGS. 19a and 19b.

Figure 19B:
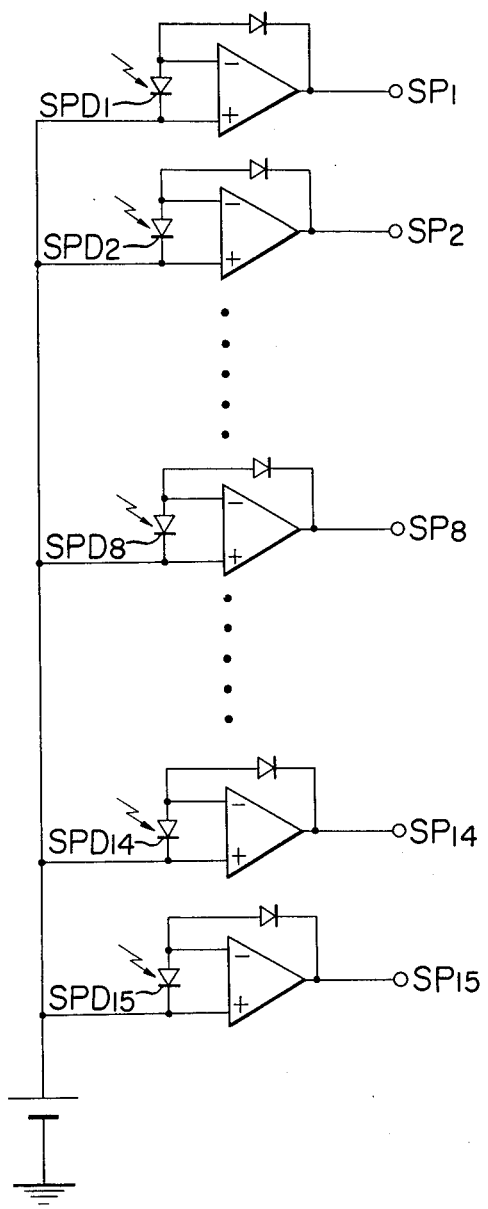

A metering circuit $A_{101}$ includes the aforementioned photodiodes $SPD_1$-$SPD_{15}$ as shown in FIG. 19b and, before the release operation of the camera, it effects the TTL open metering while dividing the picture plane into a plurality of areas by the photodiodes $SPD_1$-$SPD_{15}$. That is, it measures the object light passed through the opening of the aperture 21 of the lens. When the aperture 21 is stopped down by release operation, the object light passing through the aperture opening being stopped down is measured by the monitoring photodiode $SPD_8$, thus effecting the so-called momentary stop-down metering. The metering outputs $SP_1 = B_{v1} - A_{vo}$, $SP_2 = B_{v2} - A_{vo}$ ..., $SP_{15} = B_{v15} - A_{vo}$ ($B_{vn}$ (n=1-15) is the APEX value of the object brightness in each metering area and $A_{vo}$ is the APEX value of the open F-number of the lens) of the respective photodiodes $SPD_1$-$SPD_{15}$ are applied as input to a processing circuit $A_{102}$. The circuits $A_{101}$ and $A_{102}$ constitute a first metering circuit, and the photodiode $SPD_8$ constitutes a second metering circuit.

An information setting circuit $A_{104}$ applies an output $P_s = S_v$ ($S_v$ is the APPEX display value of ASA speed) corresponding to the film speed to a second operational circuit $A_{105}$, and also applies an output $P_F = A_{vo}$ corresponding to the open F-number of the lens to the processing circuit $A_{102}$ and a first operational circuit $A_{103}$, and further applies an output $P_T = T_{v.preset}$ ($T_v$ is the APEX display value of the shutter speed) corresponding to a preset shutter speed to an aperture control circuit $A_{106}$. The first operational circuit $A_{103}$ receives as input the multimetering output $SP_{ans.1}$ of the processing circuit $A_{102}$, the metering output $SP_8$ of the monitoring photodiode $SPD_8$ and the output $P_F$, and puts out a first operation output $SP_{ans.2}$. The second operational circuit $A_{105}$ receives the outputs $SP_{ans.2}$, $SP_8$ and $P_S$ as input and puts out a second operation output $SP_{ans.3}$ and applies it to an aperture control circuit $A_{106}$. A blocking device $A_{112}$ for blocking the operation of the aperture 21 during the stop-down operation includes an electromagnetic mechanism and is controlled by the output of the aperture control circuit $A_{106}$.

The information setting circuit $A_{104}$ applies to an eliminating circuit $A_{113}$ an output $P_M$ which selects at least the multimetering moe by the closing of switch $SW_m$ and the part metering mode by the opening of switch $SW_m$. During the part metering mode, the first operational circuit $A_{103}$ has its operation output eliminated by the eliminating circuit $A_{113}$ and $SP_{ans.2}=0$ is provided.

Operation will now be described. (1) In the case of the multimetering mode: First, before the release of the camera, the processing circuit $A_{102}$ which receives as input the TTL open metering outputs $SP_1$–$SP_{15}$ from the metering circuit $A_{101}$ puts out a multimetering output $SP_{ans.1}$ suited to the conditions of the object. At this time, the processing circuit $A_{102}$ offsets the open F-value component $A_{vo}$ of the lens included in the metering outputs $SP_1$–$SP_N$ by the output $P_F=A_{vo}$ from the information setting circuit $A_{104}$ and is putting out a multimetering output $SP_{ans.1}=B_{v.ans}$ including only the brightness information component. Subsequently, the first operational circuit $A_{103}$ receives the outputs $SP_8$, $SP_{ans.1}$ and $P_F$ as input and effects the operation of $$SP_{ans.2} = SP_{ans.1} - SP_8 - P_F \qquad (6)$$
$$= B_{v.ans} - (B_{v.8} - A_{vo}) - A_{vo}$$
$$= B_{v.ans} - B_{v.8}$$

and applies its output $SP_{ans.2}$ to the second operational circuit $A_{105}$.

Next, when the release of the camera is effected, the first operational circuit $A_{103}$ holds the output $SP_{ans.2}$ before the mirror-up. On the other hand, as the result of the release operation, the aperture 21 is stopped down from its open condition. The object light passed through this aperture opening being stopped down is measured by the monitoring photodiode $SPD_8$. The metering output thereof is $$SP_8 = B_{v.8} - A_v \qquad (7)$$

$A_v$ becomes the APEX value of the F-number in the course of the stop-down and the output $SP_8$ varies in accordance with the aperture value. The second operational circuit $A_{105}$ receives as input this metering output $SP_8$, the first operation output $SP_{ans.2}$ and the output $P_S$ and effects the operation of $$SP_{ans.3} = SP_{ans.2} + SP_8 + P_S \qquad (8)$$
$$= B_{v.ans} - B_{v.8} + S_v + B_{v.8} - A_v$$
$$= B_{v.ans} + S_v - A_v$$
$$= T_v$$

and puts out the second operation output $SP_{ans.3}$ which varies correspondingly to the variation in $A_v$ during the stop-down. Attention must be paid to the fact that the output $SP_{ans.3}$ does not include the component of $B_{v.8}$. That is, equation (8) shows that shutter speed information corresponding to the multimetering output $SP_{ans.1}$ and the aperture value $A_v$ in the course of the stop-down (output $P_S$ can be handled as a constant) is obtained. This means that when there is a difference between the multimetering output $SP_{ans.1}$ and the monitor metering output $SP_8$ (this difference is forced to exist in an ordinary object), even if the stop-down metering is effected by the monitoring photodiode, the second operation output $SP_{ans.3}$ does not depend on the monitor metering output $SP_8$. Accordingly, as will hereinafter be described, the aperture is controlled to an aperture value corresponding to the multimetering output $SP_{ans.1}$.

However, the aperture control circuit $A_{106}$ compares the output $SP_{ans.3}$ with the output $P_T$ and, when $SP_{ans.3}=P_T$, operates the blocking device $A_{112}$ to stop the stop-down of the aperture. The aperture value of the aperture 21 at this time is a proper aperture value determined by $T_{v.preset}$, $B_{v.ans}$ and $S_v$. Thereafter, a memory circuit $A_{108}$ memorizes the output $SP_{ans.3}$ when the stop-down is blocked. A shutter control circuit $A_{107}$ controls a shutter 101 in accordance with the output of the memory circuit $A_{108}$.

(2) In the case of the part metering mode: In this case, the output $B_{v.ans}-B_{v.8}$ of the first operational circuit $A_{103}$ is eliminated by the output of the eliminating circuit $A_{113}$ and $$SP_{ans.2}=0 \qquad (9)$$

This elimination is accomplished, for example, by resetting the content of a counter which digitally counts the output $SP_{ans.2}$. By doing so, equation (8) becomes $$SP_{ans.3}=B_{v.8}-A_v+S_v \qquad (10)$$

and a control corresponding to the monitor metering output of the monitoring photodiode $SPD_8$ is effected.

The display circuit $A_{110}$ receives as input the outputs $SP_8$, $P_F$, $P_S$, $P_T$, $SP_{ans.2}$ and $P_M$. When the output $P_M$ indicates that the multimetering mode is selected, the display circuit $A_{110}$ effects the operation of $$P_{F'} = SP_{ans.2} + SP_8 + P_F + P_S + P_T \qquad (11)$$
$$= B_{v.ans} + B_{v.8} + B_{v.8} - A_{vo} + A_{vo} + S_v - T_{v.preset}$$
$$= B_{v.ans} + S_v - T_{v.preset}$$

That is, this operation output $P_{F'}$ represents the aperture value to be controlled which is determined by $B_{v.ans}$, $T_{v.preset}$ and $S_v$. This aperture value is displayed.

When the output $P_M$ indicates that the part metering mode is selected, the display circuit $A_{110}$ effects an operation similar to equation (11), but since $SP_{ans.2}=0$ as shown in equation (9), the result of that operation becomes $$P_{F'}=B_{v.8}+S_v-T_{v.preset} \qquad (12)$$

This is displayed.

According to the above-described construction, the output of the first operational circuit $A_{103}$ is eliminated before and after the second operational circuit $A_{105}$ and so, the film speed introduction in the second operational circuit $A_{105}$ is required only once. This means that the construction of the present embodiment enables the shutter speed operation to be effected also by the circuit $A_{105}$, as compared with a construction in which, during the part metering mode, a shutter speed operation route which introduces the film speed into the output $SP_8$ is provided separately from the operation route of the circuits $A_{103}$, $A_{105}$ and this is applied to the aperture control circuit $A_{106}$.

Another circuit example of the third embodiment will hereinafter be described.

Figure 20:
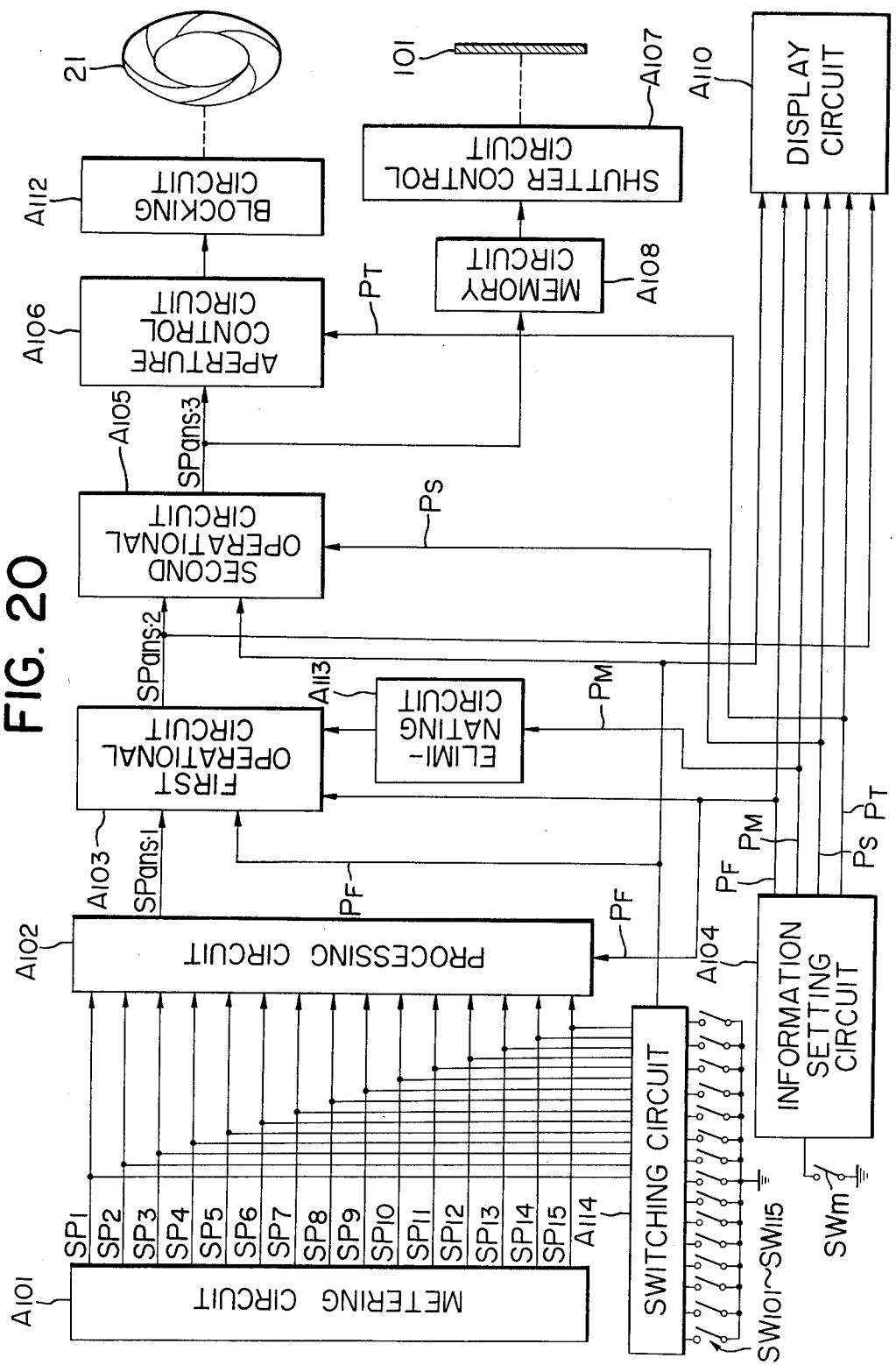
FIG. 20 shows a second circuit example of the third embodiment.

FIG. 20 shows a circuit example in which the position of the part metering area can be arbitrarily set.

A switching circuit $A_{114}$ receives as input the metering outputs $SP_1$–$SP_{15}$ from a metering circuit $A_{101}$ and applies one of them to first and second operational circuits $A_{103}$ and $A_{105}$. This selection is accomplished by selectively closing switches $SW_{101}$–$SW_{115}$ provided so as to correspond the photodiodes $SPD_1$–$SPD_{15}$ of FIG.

18. The switching circuit $A_{114}$ operates in such a manner that for example, when the switch $SW_{101}$ is closed, the metering output $SP_1$ of the photodiode $SPD_1$ is applied to the circuits $A_{103}$ and $A_{105}$ and that when the switch $SW_{102}$ is closed, the metering output $SP_2$ of the photodiode $SPD_2$ is applied to the circuits $A_{103}$ and $A_{105}$.

By doing so, the term of $B_{v.8}$ in equations (6) and (8) is substituted for by the brightness information output of a photodiode selected in accordance with the photographer's selection. The other operations are similar to what has been described previously.

This embodiment may be used in the following manner. That is, where the major object lies in an area of the picture plane which corresponds, for example, the photodiode $SPD_{10}$ of FIG. 18, multimetering is first selected by an information setting circuit $A_{104}$. A display circuit $A_{110}$ displays the aperture value in accordance with equation (11).

Next, part metering is selected by the information setting circuit $A_{104}$ and further, the switch $SW_{110}$ is closed to render the part metering area into the metering area of the photodiode $SPD_{10}$ corresponding to the major object. At this time, the display circuit $A_8$ displays the aperture value obtained by equation (12) ($B_{v.8}$ is substituted for by the brightness of the area metered by a selected photodiode). When the aperture values displayed by a display circuit $A_{110}$ become coincident by these two operations (namely, the multimetering mode and the part metering mode), the multimetering output indicates that the exposure is adjusted to the major object and, when said aperture values are not coincident, it is seen that the exposure is adjusted to other than the major object.

Accordingly, the photographer can discriminate whether or not the exposure adjustment he intends is effected with respect to the major object.

We claim:

1. An exposure control device of a camera having aperture control means for varying an aperture of a phototaking lens, said device comprising:
   first metering means for effecting metering while dividing an object into a plurality of metering areas and for generating a first metering output determining an exposure of the object on the basis of a plurality of photoelectric outputs corresponding to said areas;
   second metering means for metering said object through said aperture to generate a second metering output;
   first operational means for generating a first operation output including information on the difference between said first metering output and said second metering output;
   second operational means for adding said second metering output during operation of said aperture control means and said first operation output and generating a second operation output; and
   blocking means for blocking said operation of said aperture control means when said second operation output and an output corresponding to a preset shutter speed assume a predetermined relation.

2. The device according to claim 1, wherein said camera includes finder optical means having a focus plate, and wherein said first metering means includes a plurality of photoelectric converting means provided so as to be capable of receiving a light passed through the focus plate and means for processing the outputs of said plurality of photoelectric converting means, and said second metering means includes at least one of said photoelectric converting means.

3. The device according to claim 1, wherein said camera includes finder optical means having a focus plate and wherein said first metering means includes a plurality of photoelectric converting means provided so as to be capable of receiving a light passed through said focus plate and means for processing the outputs of said plurality of photoelectric converting means, and said second metering means includes at least one of said photoelectric converting means, said at least one photoelectric converting means being disposed to correspond to the central area of the object.

4. The device according to claim 1, wherein said second metering means includes photoelectric converting means provided so as to be capable of receiving the light from the object reflected by a film surface and/or a shutter curtain surface.

5. The device according to claim 1, wherein said first operational means includes:
   (a) a calculating circuit for effecting the subtraction of said first metering output and said second metering output; and
   (b) a circuit for holding the output of said calculating circuit.

6. The device according to claim 5, wherein said second operational means includes a circuit for adding together said second metering output and the output of said holding circuit.

7. A camera having an aperture of a phototaking lens stopped down from a maximum aperture opening in association with exposure operation and an exposure control device controllable said aperture for adjusting said aperture opening comprising:
   first metering means for effecting metering while dividing an object into a plurality of areas and for generating a plurality of photoelectric outputs corresponding to said areas and generating, on the basis of said photoelectric outputs, a first metering output which is a proper exposure value;
   second metering means for metering the light through said aperture opening at least until said stopping down being completed to generate a second metering output according to the intensity of said light varying with said stopping down;
   means for comparing said first metering output with said second metering output before the initiation of said stopping down and producing an output indicating a relative value between said first metering output and said second metering output; and
   means for displaying said relative value in response to said relational output.

8. The camera according to claim 7 which further comprises a finder optical means having a focus plate on which said phototaking lens forms an image of said object, wherein said firts metering means includes a plurality of photoelectric converting means, means for disposing said plurality of photoelectric converting means relative to said finder optical means so that each of said photoelectric converting means is capable of receiving the light from the different parts of said image one another and means for processing the output of said plurality of photoelectric converting means, and said second metering means includes at least one of said photoelectric converting means.

9. The camera according to claim 7 which further comprises a shutter curtain adjacent to a film surface, wherein said second metering means includes photoelectric converting means disposed to face the surface of said shutter curtain.

10. The device according to claim 7, further comprising second display means for displaying exposure information corresponding to said first metering output.

11. The device according to claim 7, wherein said comparing means includes means for subtracting said first metering output and said second metering output to produce said relative value indicating output.

12. The device according to claim 7, wherein said comparing means includes a circuit for calculating exposure information corresponding to the difference between said first metering output and said second metering output, and said display means includes:
 a circuit for operating an aperture value corresponding to said first metering output from said first metering output, film speed and a preset shutter speed;
 a circuit for operating an aperture value corresponding to said second metering output from the output of said calculating circuit and the aperture value corresponding to said first metering output; and
 means for displaying the aperture value corresponding to said second metering output.

13. An exposure control device of a camera having aperture control means for varying an aperture of a phototaking lens, said device comprising:
 first metering means for effecting metering while dividing an object into a plurality of areas and for generating a first metering output determining an exposure of the object on the basis of a plurality of photoelectric outputs corresponding to said areas;
 second metering means for metering a part area of said object and generating a second metering output corresponding to the brightness of said part area;
 first operational means for generating a first operation output corresponding to the difference between said first metering output and said second metering output;
 second operational means for generating a second operation output which is the second metering output during operation of said aperture control means having the first operation output added thereto;
 eliminating means capable of arbitrarily eliminating said first operation output; and
 means for effecting exposure control in response to said second operation output.

14. The device according to claim 13, wherein said camera includes a finder optical means having a focus plate, and wherein said first metering means includes a plurality of photoelectric converting means provided so as to be capable of receiving a light passed through the focus plate and means for processing the outputs of said plurality of photoelectric converting means, and said second metering means includes at least one of said photoelectric converting means.

15. The device according to claim 14, wherein said one photoelectric converting means included in said second metering means is disposed so as to correspond to the central area of said object.

16. The device according to claim 14, wherein said second metering means includes means for arbitrarily selecting said one photoelectric converting means from among said plurality of photoelectric converting means.

17. A camera comprising:
 means for driving an aperture of a phototaking lens to cause a reduction of an aperture diameter;
 means for driving a shutter of said camera;
 first metering means for effecting metering while dividing an object into a plurality of metering areas and for generating a first metering output determining an exposure of the object on the basis of plurality of photoelectric outputs corresponding to said area;
 second metering means for metering said object through said aperture to generate a second metering output;
 first operational means for generating a first operation output including information on the difference between said first metering output and said second metering output both of which are generated before said reduction of said aperture diameter is caused;
 second operational means for adding said second metering output generated during said reduction of said aperture diameter and said first operation output and generating a second operation output; and
 exposure control means for determining at least one of an aperture value depended on said aperture and a time value depended on said shutter in response to said second operation output.

18. The camera according to claim 17, wherein said exposure control means includes means for presetting said time value and means for blocking said aperture driving means to prevent said reduction of said aperture diameter when said diameter operation output and an output corresponding to said time value present by said presetting means assume a predetermined relation.

19. The camera according to claim 17, wherein said exposure control means includes means for determining a combination of said aperture value and said time value and means for controlling said aperture driving means and said shutter driving means in accordance with said combination respectively.

20. An exposure control device of a camera having aperture control means for varying an aperture of a phototaking lens, said device comprising:
 first metering means for effecting metering while dividing an object into a plurality of areas and for generating a first metering output determining an exposure of the object on the basis of a plurality of photoelectric outputs corresponding to said areas;
 second metering means for metering a part area of said object and generating a second metering output corresponding to the brightness of said part area;
 first operational means for generating a first operation output corresponding to the difference between said first metering output and said second metering output;
 second operational means for generating a second operation output which is the second metering output during operation of said aperture control means having the first operation output added thereto; and
 means for effecting exposure control in response to said second operation output.

21. An exposure control device of a camera having aperture control means for varying an aperture of a phototaking lens, said device comprising:
 first metering means for effecting metering while dividing an object into a plurality of areas and for generating a first metering output determining an exposure of the object on the basis of a plurality of photoelectric outputs corresponding to said areas;

second metering means for metering a part area of said object and generating a second metering output corresponding to the brightness of said part area;

first operational means for generating a first operation output corresponding to the difference between said first metering output and said second metering output;

second operational means for generating a second operation output which is the second metering output during operation of said aperture control means having the first operation output added thereto;

mode selecting means for changing-over the exposure control mode between a first mode and a second mode;

first control means for effecting exposure control in response to said second operation output when said first mode is being selected; and second control means effecting exposure control in response to said second metering output when said second mode is being selected.

* * * * *

UNITED STATES PATENT AND TRADEMARK OFFICE
CERTIFICATE OF CORRECTION

PATENT NO. : 4,448,506
DATED : May 15, 1984
INVENTOR(S) : TAKASHI SAEGUSA, ET AL.

It is certified that error appears in the above-identified patent and that said Letters Patent is hereby corrected as shown below:

Column 9, line 54, change "F.D." to --$P_{F.D}$--;

Column 18, line 29 [line 1 of formula (11)], change "PT" to --$P_T$--;

line 43, [formula (12)], change "$P_F$," to --$P_{F"}$--.

Column 22, line 31, [Claim 18, line 5] change "diameter" (second occurrence) to --second--.

Signed and Sealed this

Twenty-fourth Day of July 1984

[SEAL]

Attest:

GERALD J. MOSSINGHOFF

Attesting Officer   Commissioner of Patents and Trademarks